United States Patent [19]

Suzuki et al.

[11] 4,433,479
[45] Feb. 28, 1984

[54] METHOD OF MAKING A WIRE HARNESS

[75] Inventors: Yoshitsugu Suzuki, Mishima; Syogo Iizuka, Cotenba; Shigeo Kajiyama, Shizuoka; Kenji Usui, Gotenba; Masahiro Kobayashi, Susono, all of Japan

[73] Assignee: Yazaki Corporation, Tokyo, Japan

[21] Appl. No.: 223,234

[22] Filed: Jan. 8, 1981

Related U.S. Application Data

[62] Division of Ser. No. 80,682, Oct. 1, 1979.

[30] Foreign Application Priority Data

| Sep. 29, 1978 | [JP] | Japan | 53-120280 |
| Nov. 20, 1978 | [JP] | Japan | 53-142212 |
| Nov. 20, 1978 | [JP] | Japan | 53-142213 |

[51] Int. Cl.³ .......................................... H01R 43/00
[52] U.S. Cl. ................................. 29/825; 29/564.6; 29/755
[58] Field of Search ............... 29/745, 867, 755, 825, 29/857, 861, 863, 564.6, 433, 564.4; 81/9.51; 156/433

[56] References Cited

U.S. PATENT DOCUMENTS

| 3,693,228 | 9/1972 | Logan | 29/755 X |
| 3,804,130 | 4/1974 | Tarbox et al. | 29/755 X |
| 3,842,496 | 10/1974 | Mercer | 29/564.6 X |
| 3,930,524 | 1/1976 | Tarbox | 29/755 X |
| 3,964,959 | 6/1976 | Adams | 156/433 |
| 4,114,014 | 9/1978 | Shogo et al. | 29/564.4 X |

FOREIGN PATENT DOCUMENTS 2344950  7/1975  Fed. Rep. of Germany ........ 29/745

*Primary Examiner*—Howard N. Goldberg
*Assistant Examiner*—Carl J. Arbes
*Attorney, Agent, or Firm*—Lackenbach, Siegel, Marzullo, Presta & Aronson

[57] ABSTRACT

A wire harness manufactured by a new method and a new apparatus is provided. A covered wire paid out from a selected one of reels is extended in a predetermined lay-out and fixed. The thus fixed wire is cut-off from the reel. Then, another wire is paid out from another reel for arranging it in a juxtaposing relation to the previously laid-out wire and cut off from the reel. After repeating the above steps, the arranged wires are tied up to form a wire harness. There is also provided a device which puts the above method into practice, thereby reducing complicated assorting work involved in the manufacture of a wire harness. A method and a device for automatically uncovering end portions of each wire of the wire harness and attaching terminals thereto are also provided to greatly increasing the productivity.

11 Claims, 56 Drawing Figures

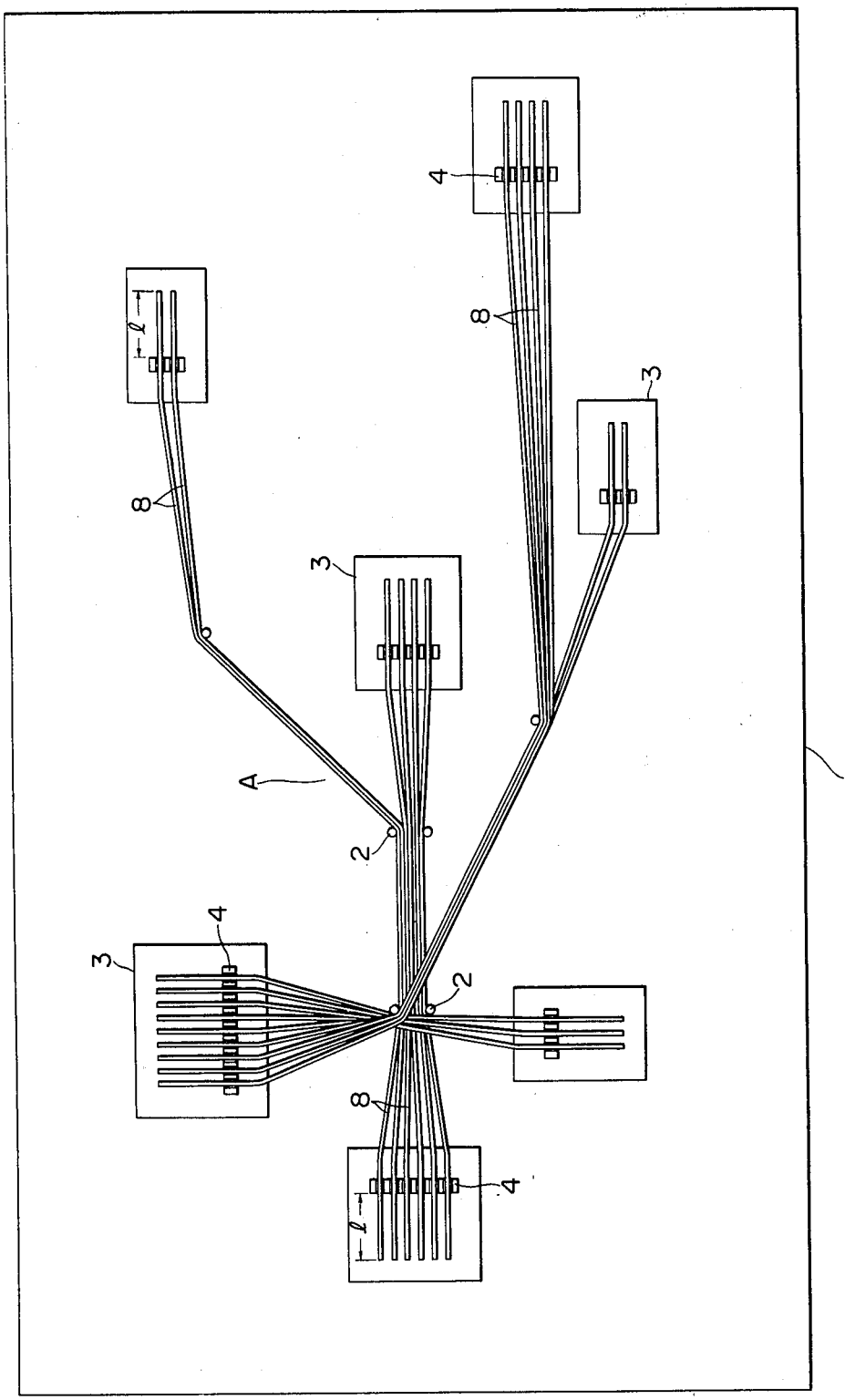
FIG.1-A

FIG. I-B
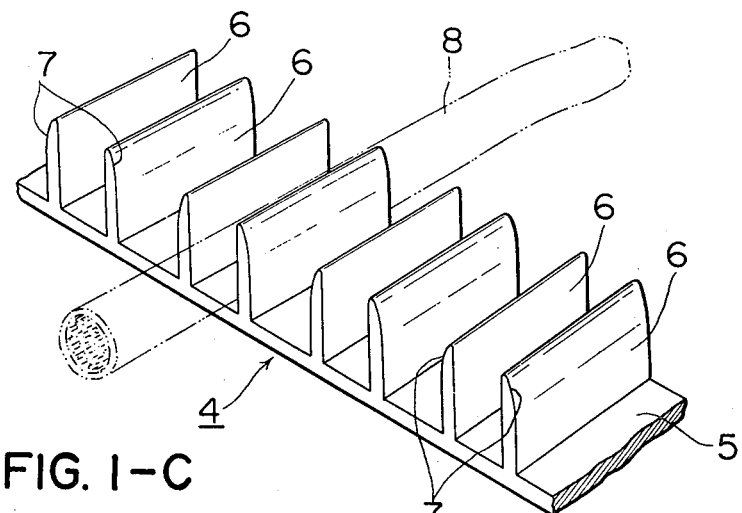
FIG. I-C
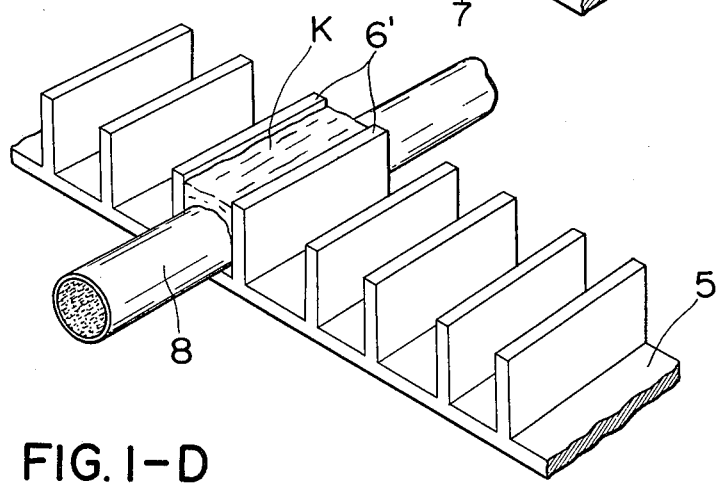
FIG. I-D
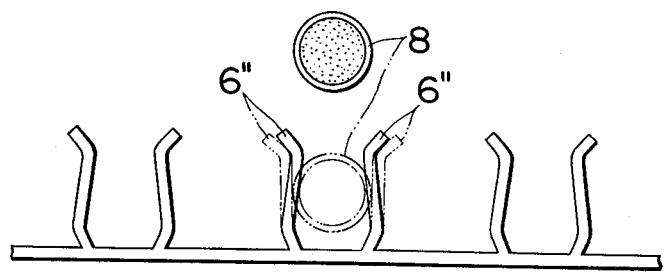

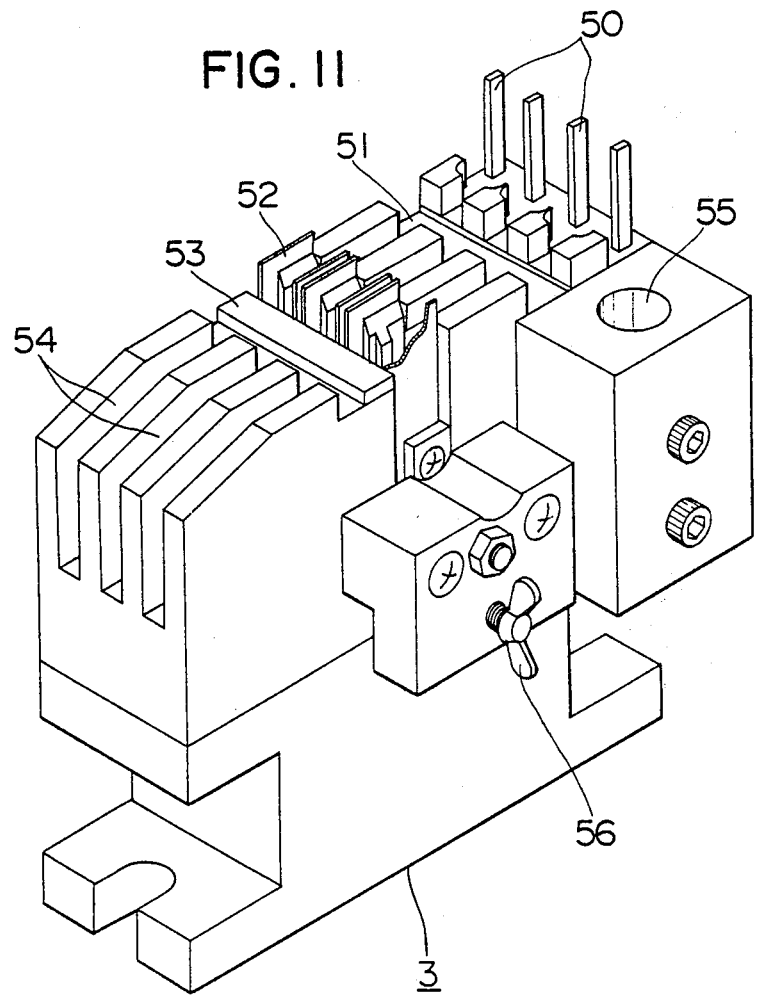

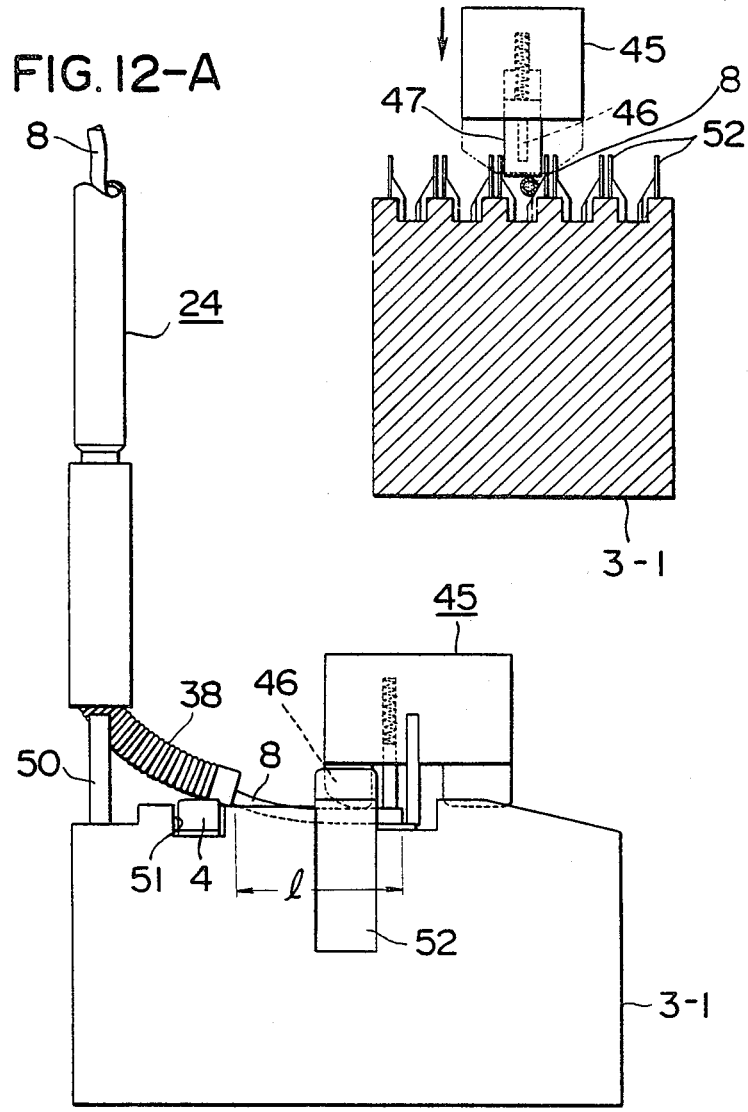

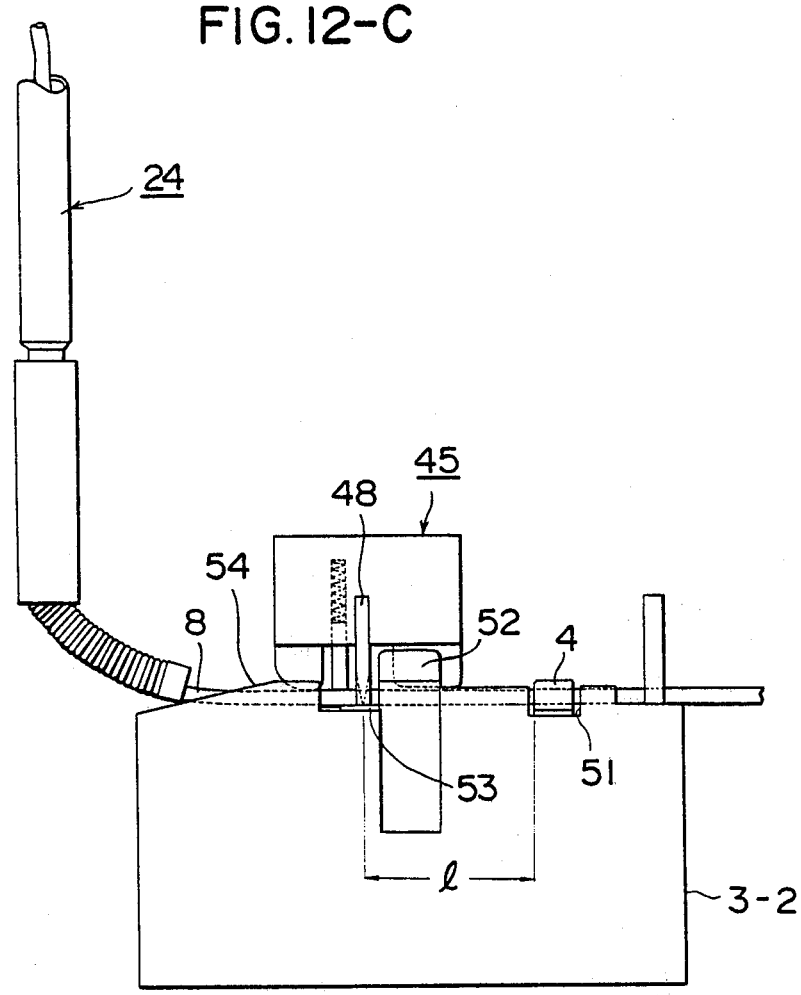

FIG.13-A
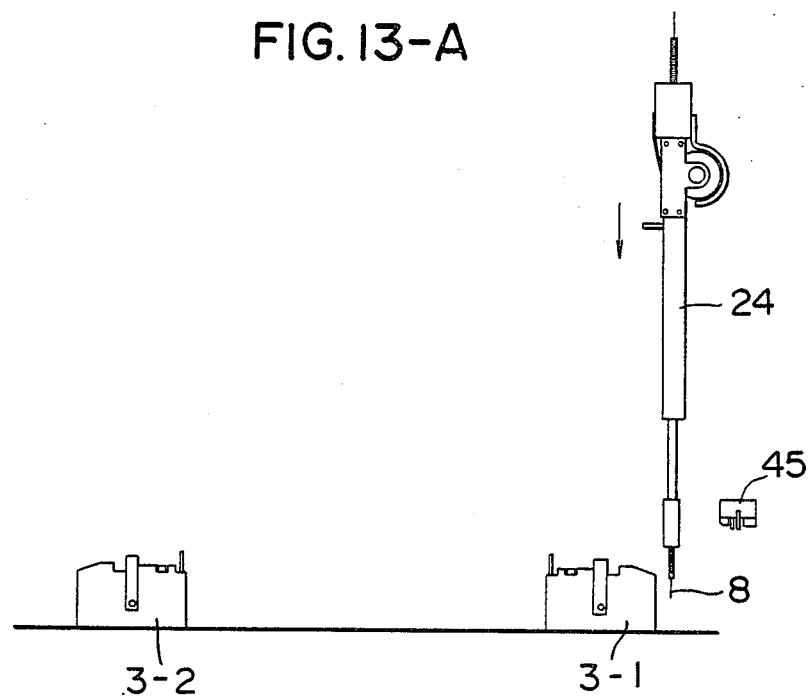
FIG.13-B
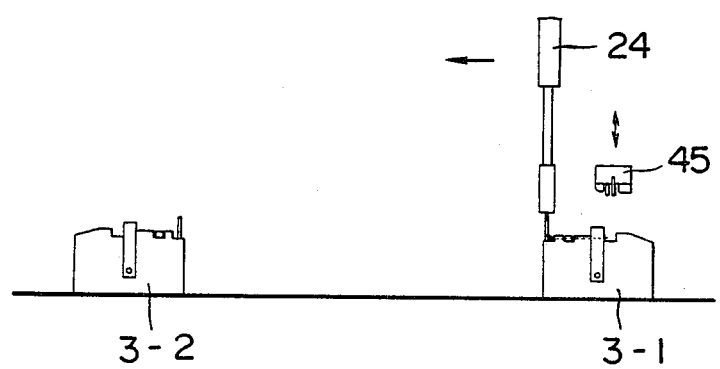

FIG.13-C
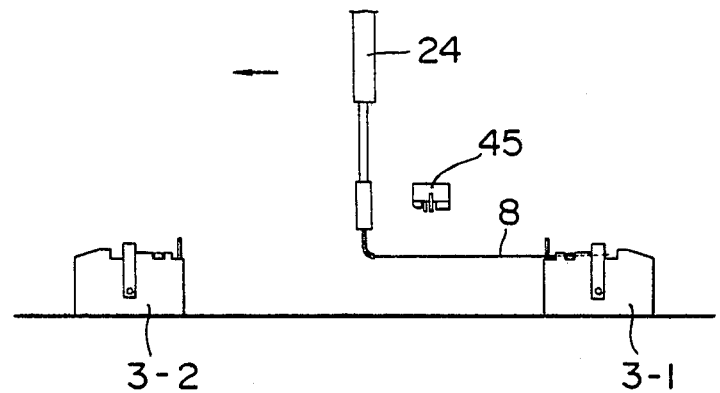
FIG.13-D
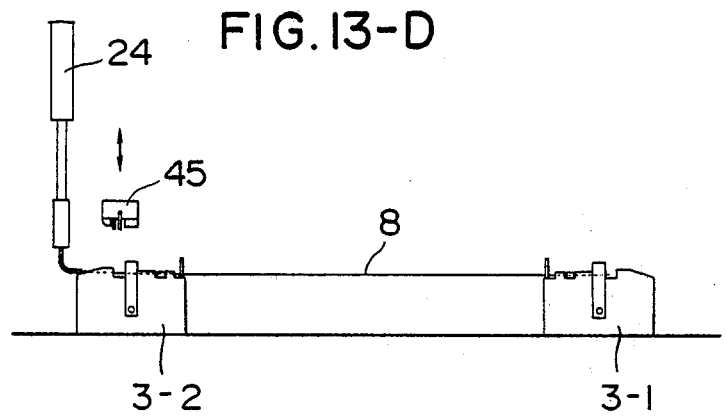
FIG.13-E
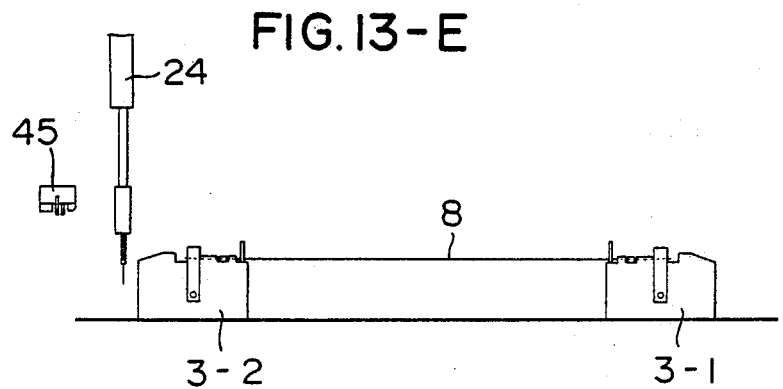

FIG. 14-A
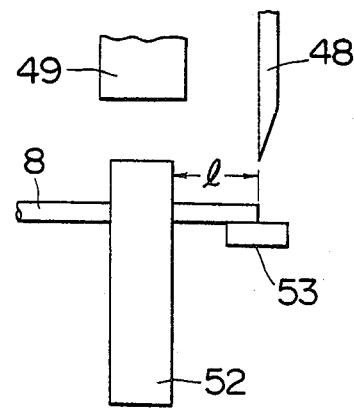
FIG. 14-B
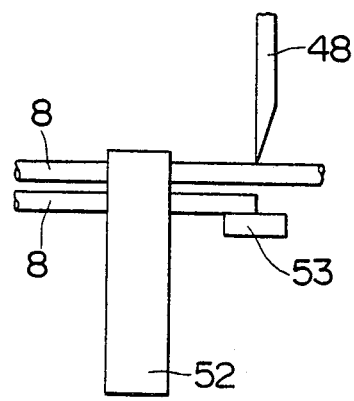

FIG. 15-A
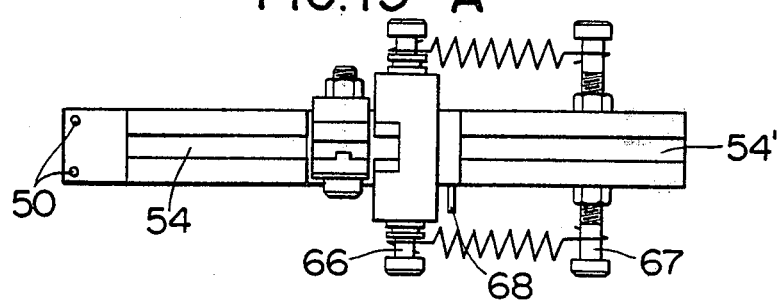
FIG. 15-B
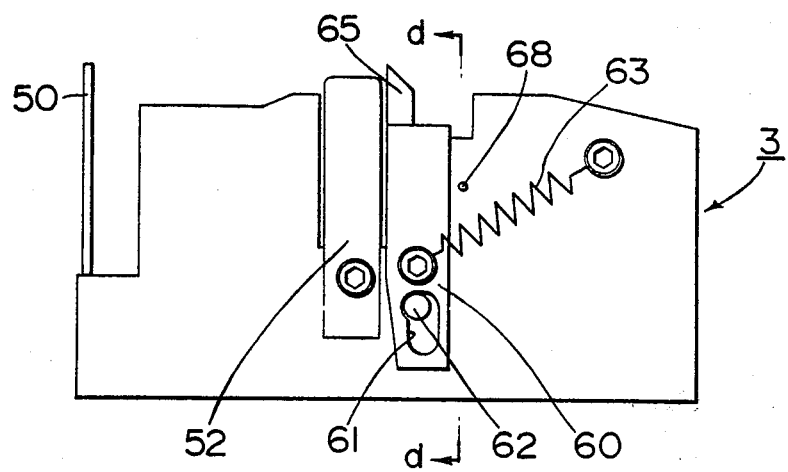
FIG. 15-C
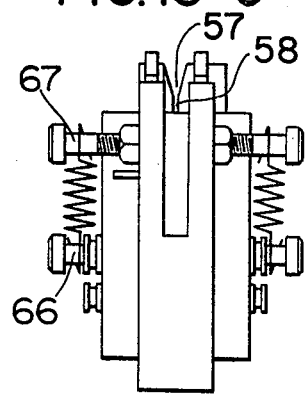
FIG. 15-D
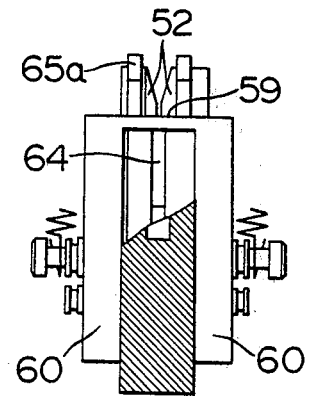

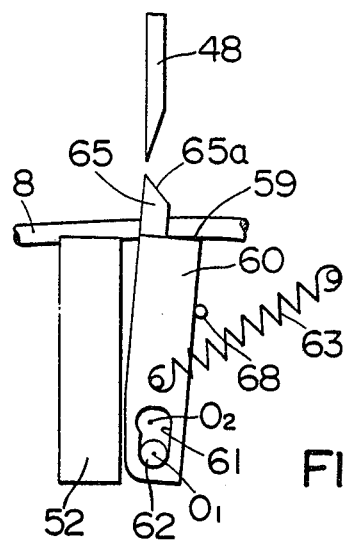
FIG.16-A
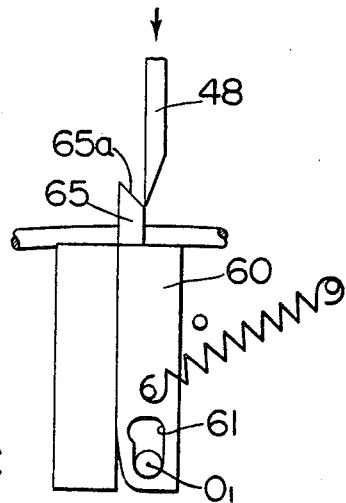
FIG.16-B
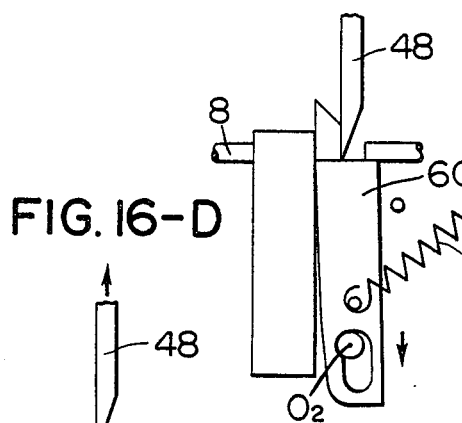
FIG.16-C
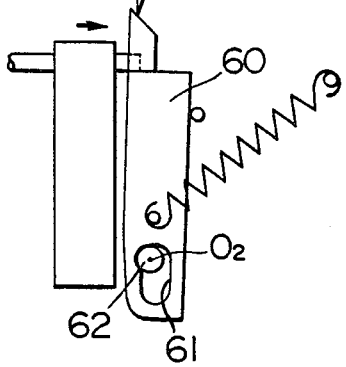
FIG.16-D
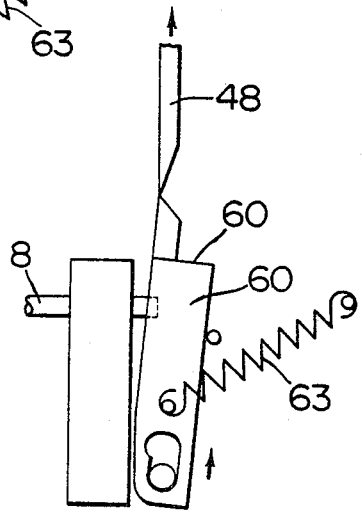
FIG.16-E

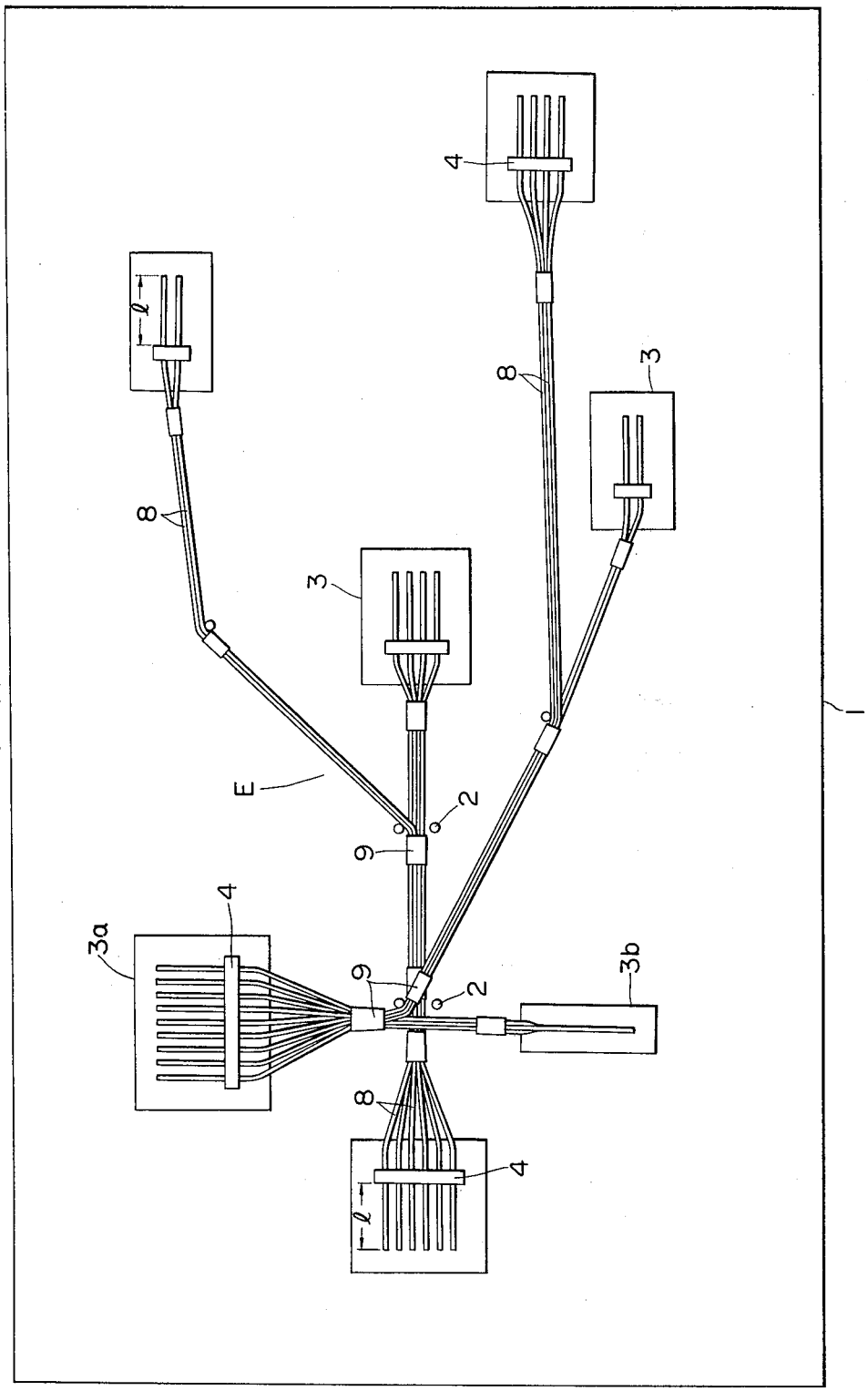

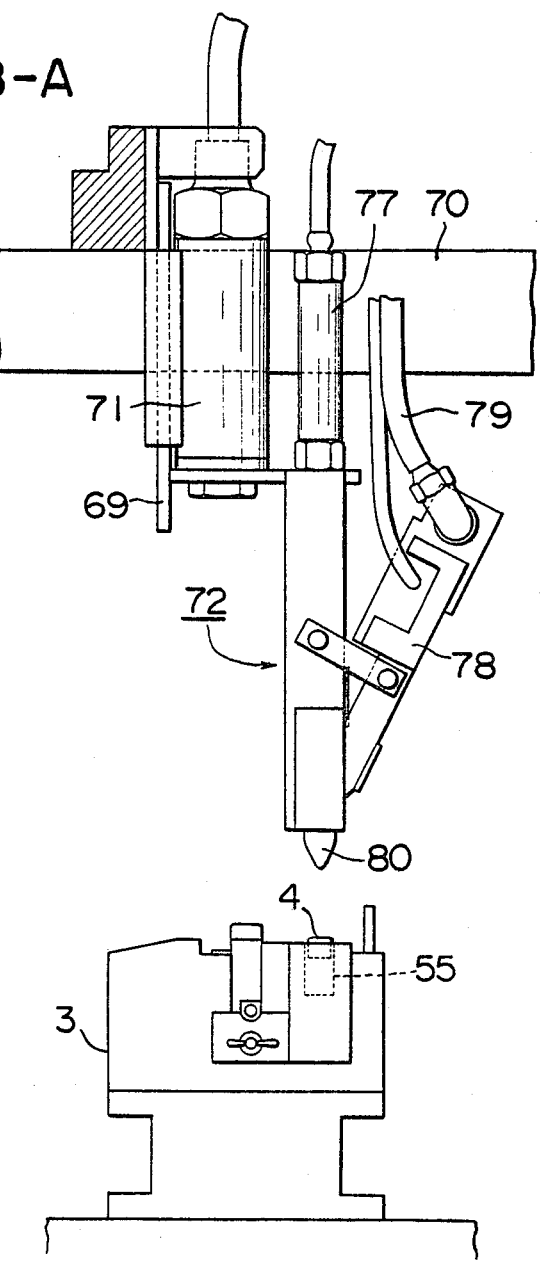
FIG.18-A

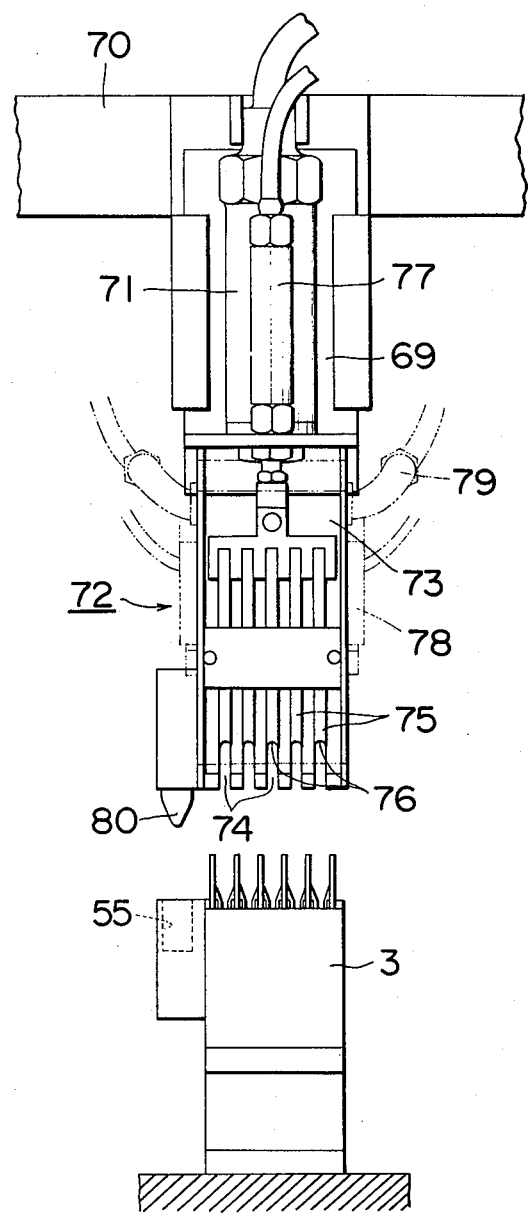
FIG. 18-B

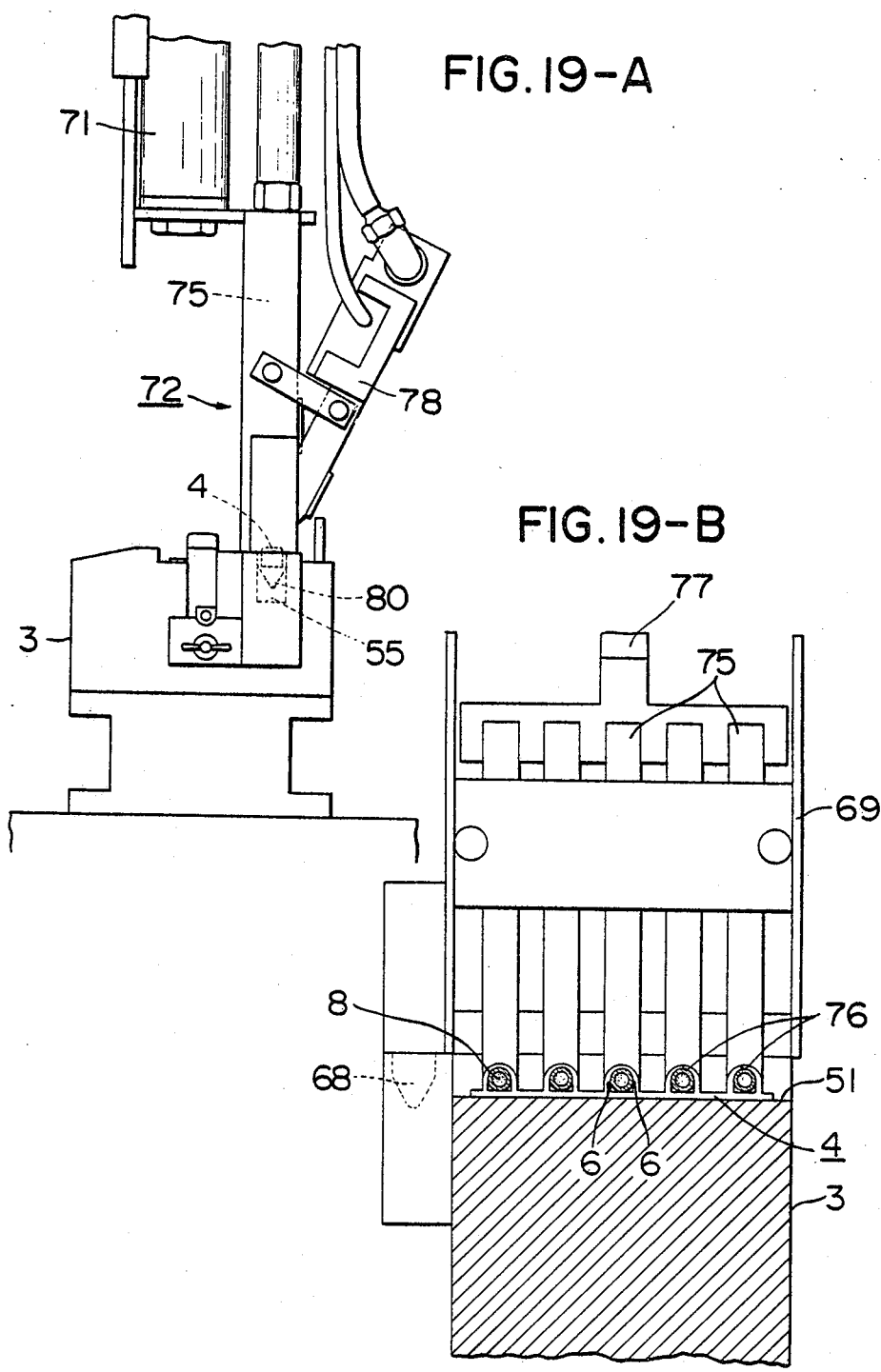

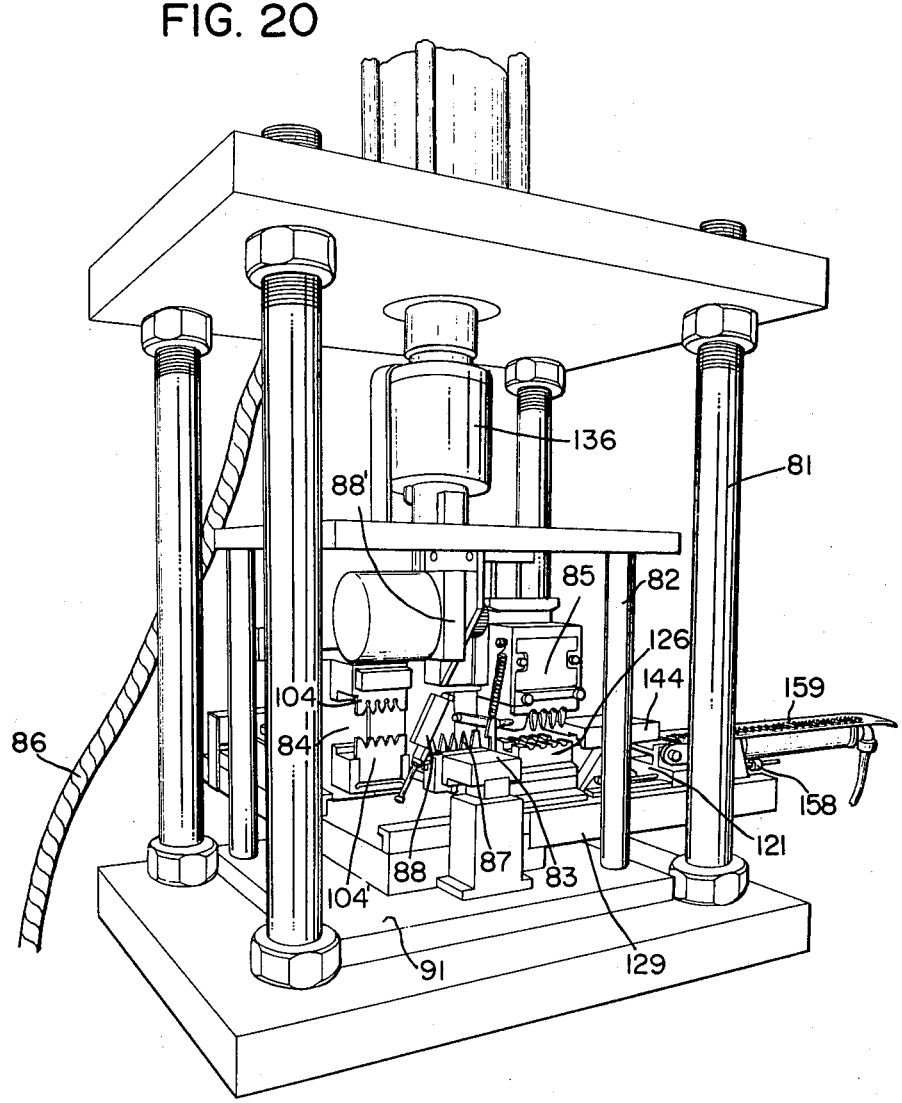

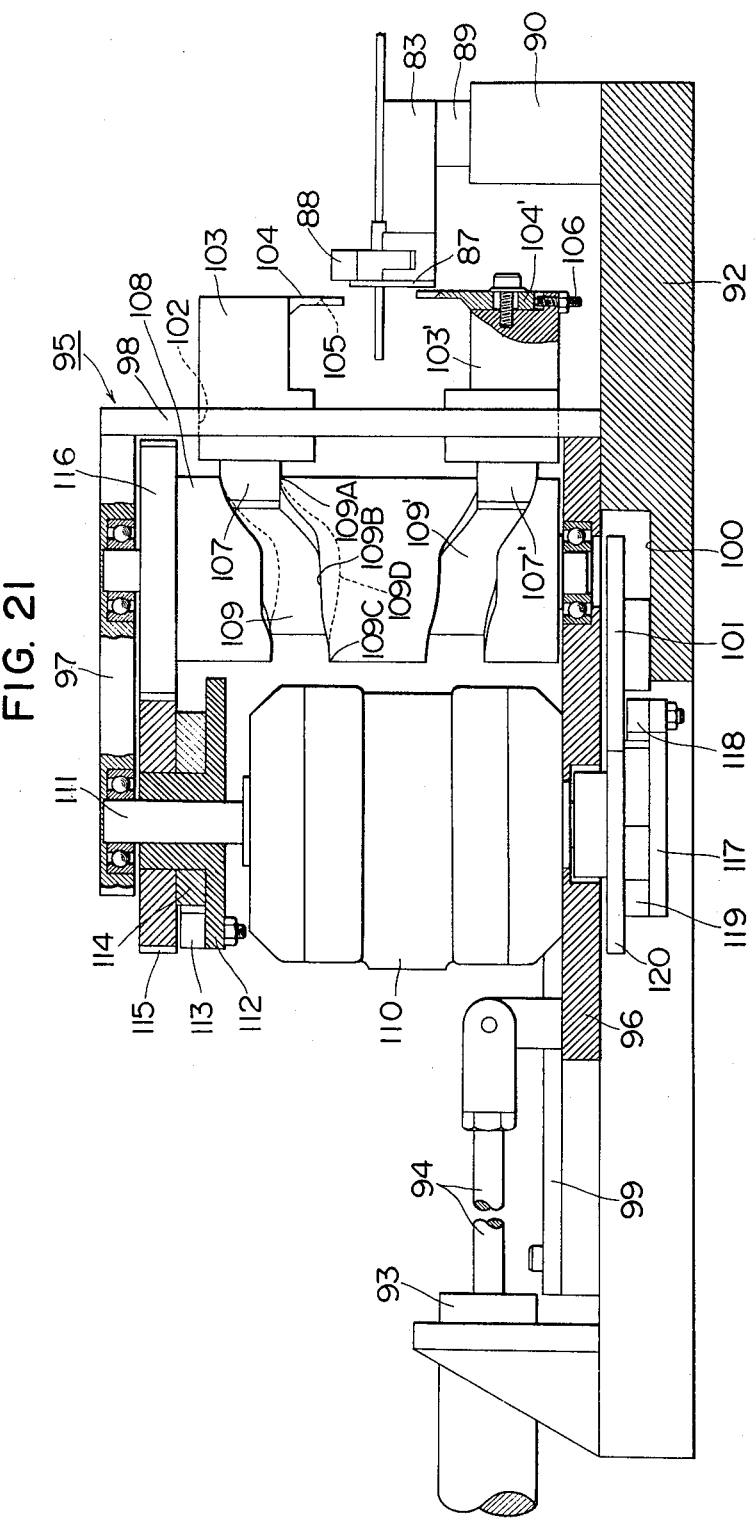

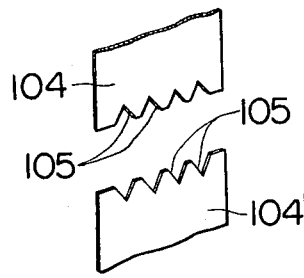
FIG. 22
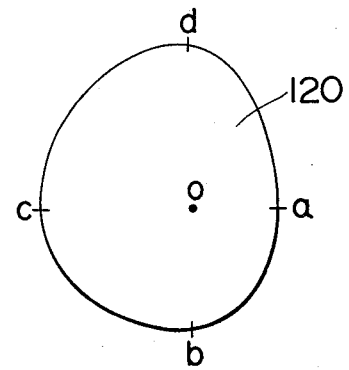
FIG. 23
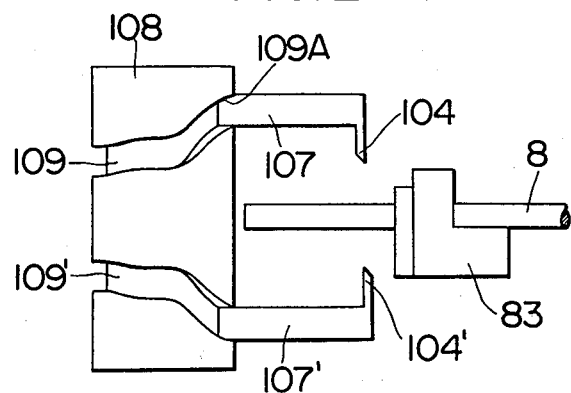
FIG. 24-A
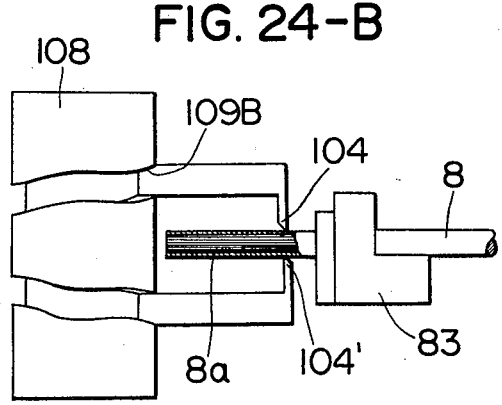
FIG. 24-B

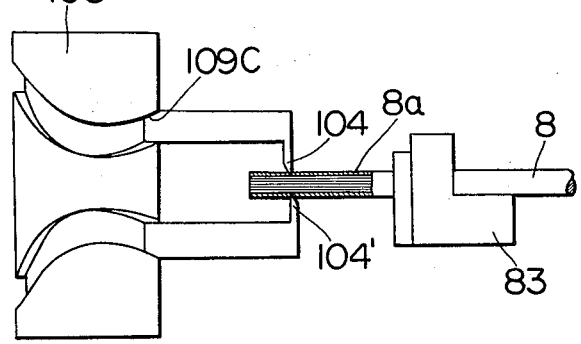
FIG. 24-C
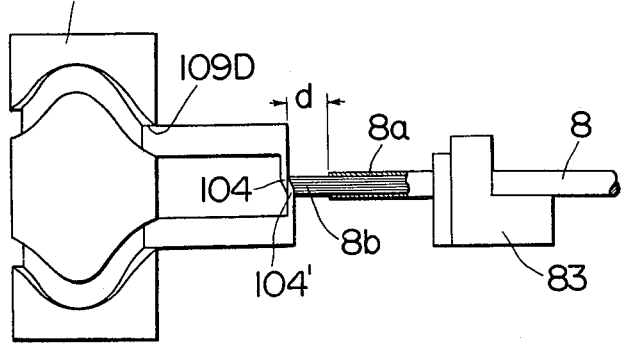
FIG. 24-D

FIG. 28-A 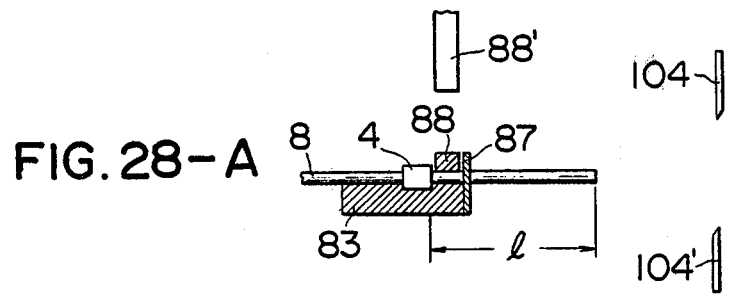
FIG. 28-B 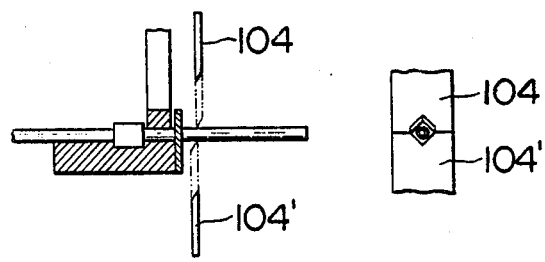
FIG. 28-C 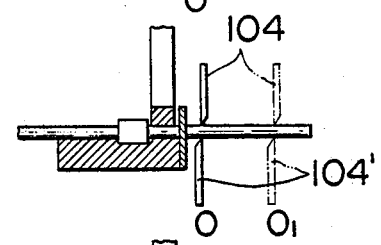
FIG. 28-D 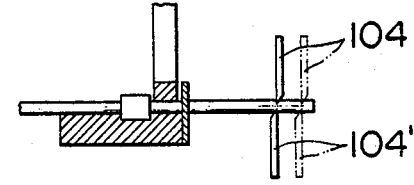
FIG. 28-E 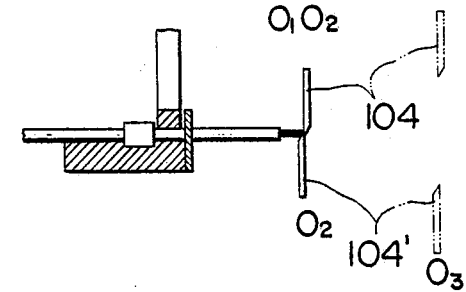

FIG. 29-A
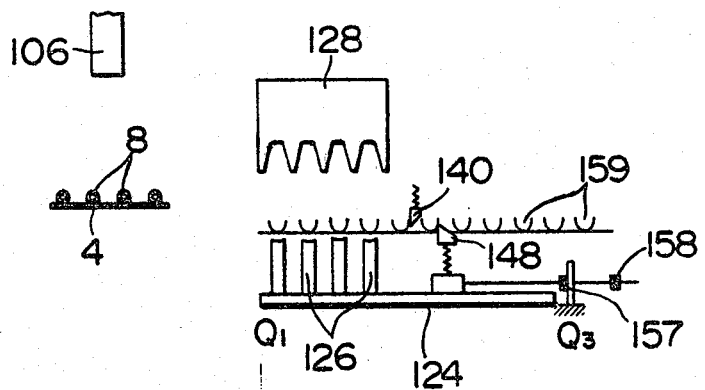
FIG. 29-B
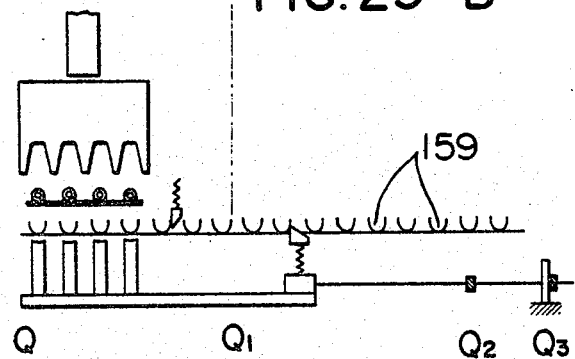

METHOD OF MAKING A WIRE HARNESS

This is a division of application Ser. No. 80,682 filed Oct. 1, 1979.

BACKGROUND OF THE INVENTION

The present invention relates to wire harnesses.

A wire harness generally consists of a large number of wires combined together to form branches of main lines. Terminals connectors or like members are connected to the respective branches. Various automatic wiring methods have heretofore been proposed to save time and labor in the production of such wire harnesses.

In principle the, prior art uses wires precut to a determined length and laid between intended terminals, connectors, or like members. Such processes are time consuming which is reflected by poor productivity.

SUMMARY OF THE INVENTION

An object of the present invention is to provide a wire harness which can be manufactured by a time and labor saving method which comprises laying a wire on a plurality of pre-arranged bridges, cutting said laid wire to a predetermined length, and repeating the above step. The thus provided wire harness comprises a plurality of bridges arranged with predetermined spacings therebetween; and a plurality of covered wires held by said bridges at their end portions, said wires crossing over each bridge with suitable spacings therebetween, said end portions which extend from said bridge being of equal length to each other. In another aspect, the wire harness comprises a plurality of bridges arranged with predetermined spacings therebetween; a plurality of covered wires held by said bridges at their end portions, said wires crossing over each bridge with equal spacings therebetween, said end portions which extend from said bridge being of equal length to each other; and a terminal members attached to uncovered portion of each end portions. In a further aspect, the wire harness comprises a plurality of bridges arranged with predetermined spacings therebetween; a plurality of covered wires held by said bridges at their end portion, said wires crossing over each bridge with equal spacings therebetween, said end portions which extend from said bridge being of equal length to each other; a terminal member attached to an uncovered portion of each end portions; and a housing connector accomodating said terminal member.

Another object of the present invention is to provide a method which reduces the time and labor needed for the production of wire harnesses and thereby to make inexpensive wire harnesses. In order to achieve this objective, the method of the invention perform simultaneous laying and cutting of wires and, during the laying and cutting operation, secures neatly arranged end portions of wires to a bridge at suitable spacings so as to facilitate the subsequent easy connection of metallic terminal members and the fixation of connectors.

More specifically, the method according to the invention uses a plurality of wiring blocks arranged at given distances on a work table prior to wiring proceduress. Layed on each block is a bridge for carrying thereon a set of suitably spaced wires. With a wiring head having nosepieces in the form of coil springs at its leading end, the process comprises the steps of anchoring a piece of wire to a first wiring block, stretching the wire toward a second wiring block, anchoring the wire to said second block and cutting the wire. The procedure is repeated to lay a plurality of wires successively between those desired wiring blocks. The bridge retains end portions of the corresponding set of wires in suitably spaced positions.

The thus obtained set of wires are further subjected to a terminal fixing step and a connector housing attaching step.

BRIEF DESCRIPTION OF THE DRAWINGS

FIG. 1-A illustrates a wire harness prepared on a worktable at a stage of the method of the present invention;

FIG. 1-B is a perspective view of one embodiment of the invention having a bridge engaging a wire thereon which is being subjected to a step of the method of FIG. 1-A;

FIG. 1-C is another example of a bridge;

FIG. 1-D is a further example of a bridge;

FIG. 11 is a perspective view of one of wiring blocks arranged on the worktable shown in FIG. 1-A;

FIGS. 12-A, 12-B, 12-C show positional relationships between the wiring block, the wiring jig, and the clamping jig;

FIGS. 13-A to 13-E show a series of wiring steps by using the wiring blocks, the wiring jig, and the clamping jig;

FIGS. 14-A and 14-B show a situation where two wires are to be laid on one another and subjected to the cutting step;

FIG. 15-A is a plan view of another embodiment of a wiring block to cope with the situation shown FIGS. 14-A and 14-B;

FIG. 15-B is a side elevational view of the wiring block of FIG. 15-A;

FIG. 15-C is a front elevational view of the wiring block of FIG. 15-A;

FIG. 15-D is a cross sectional view of the wiring block of FIG. 15-B taken along the line d—d thereof;

FIGS. 16-A to 16-E show in sequence the operation of an arm provided on the wiring block of FIGS. 15-A to 15-D;

FIG. 17 shows another example of a wire harness obtained by the wiring block of FIGS. 15-A to 15-D;

FIG. 18-A shows in side elevation a fusing unit under which the work table is adapted to travel;

FIG. 18-B is a front elevational view of the fusing unit of FIG. 18-A;

FIG. 19-A illustrates an engagement of the fusing unit and of the wiring block;

FIG. 19-B is a front elevational view of FIG. 19-A;

FIG. 20 is a perspective view of a device for removing an insulation covering of one end portion of each wire of the wire harness and fixing a terminal thereon;

FIG. 21 is a side elevational view partly in section of wire uncovering and cutting unit provided in the device of FIG. 20;

FIG. 22 is a fragmentary view illustrating the cutting edges attached to the unit of FIG. 21;

FIG. 23 is an illustration of a flat cam attached to the unit of FIG. 21;

FIGS. 24-A to 24-D show in sequence an operation of the cutting edges to remove an insulative covering of the wire and cutting the wire conductor;

FIGS. 28-A to 28-E are a series of views or illustrations of the operation of the wire uncovering and cutting unit; and FIGS. 29-A to 29-B are schematic views illustrating the operation of the terminal fixing unit.

DETAILED DESCRIPTION OF THE PREFERRED EMBODIMENTS

Figure 2:
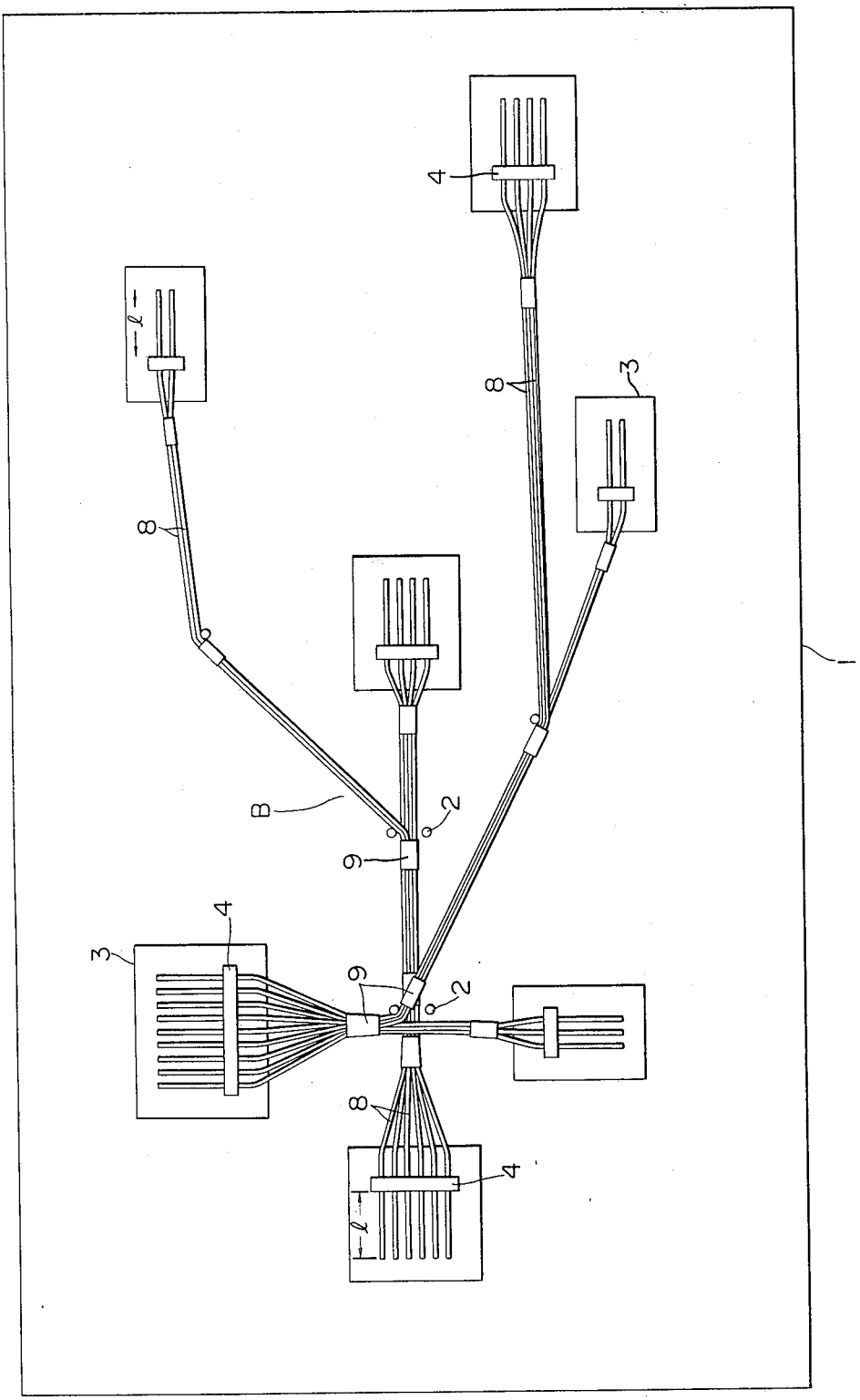
FIG. 2 shows a wire harness prepared at a stage subsequent to that shown in FIG. 1-A.

The present invention will hereinafter be described in detail with reference to the accompanying drawings.

Referring to FIG. 1A, the reference numeral 1 designates a work table on which pins 2 and wiring blocks 3 are positioned.

Lying on each of the wiring blocks 3 is a bridge 4 which, as viewed in FIG. 1B, comprises a base 5 and multiple pairs of parallel fusable holding pieces 6 spaced at common perpendicular intervals and extending along the longitudinal direction of the base. The holding pieces 6 in each pair have bevelled sides or slants 7 on their outer top surfaces. In use, the bridge 4 is suitably made for the intended number of wires to be nested in the bridge. Preferably, the bridges 4 are formed of a thermoplastic resinous material similar to that employed for insulative coverings of wires. However, the bridge may be made of any material if the wire 8 is pasted or adhered between the holding pieces 6' by suitable means such as adhesive K as shown in FIG. 1-C. Alternatively, the bridge may have a plurality of resilient holding pieces 6" such that the wires 8 are resiliently held therebetween when pressed in.

Wires 8 are securely nested in sequence in between the cooperating pairs of pieces 6 on each bridge 4 by a cooperative mechanism including the blocks 3 and a programmable automatic machine, i.e. a wiring head with a clamping jig. Those portions of respective wires 8 extending beyond the bridge 4 are cut off at a predetermined length l from the bridge. The wires are laid over corresponding blocks 3 thereby constituting a wire harness generally designated A in FIG. 1-A.

After the installation of the wires 8, table 1 is bodily moved to the next station in which a fusing unit corresponding to each block 3 is activated to melt the pieces 6 of the bridge 4 simultaneously onto the insulative coverings of the wires 8. Strips of tape 9 for temporary fastening are then wound round branching portions of the respective sets of wires.

The procedure stated above yields a wire harness B shown in FIG. 2. In harness B, wires 8 extend at predetermined spacings and in predetermined numbers and the bridges 4 securely hold the corresponding sets of wires at a given spacing.

The wires of the wire harness B are layed automatically at the required spacings and numbers while their terminal portions are neatly arranged and fixed by the bridges with a predetermined length thereof extending beyond the bridges. This type of wire harness B though only semiprocessed can be stored and transported advantageously before it advances to any subsequent step.

Figure 3:
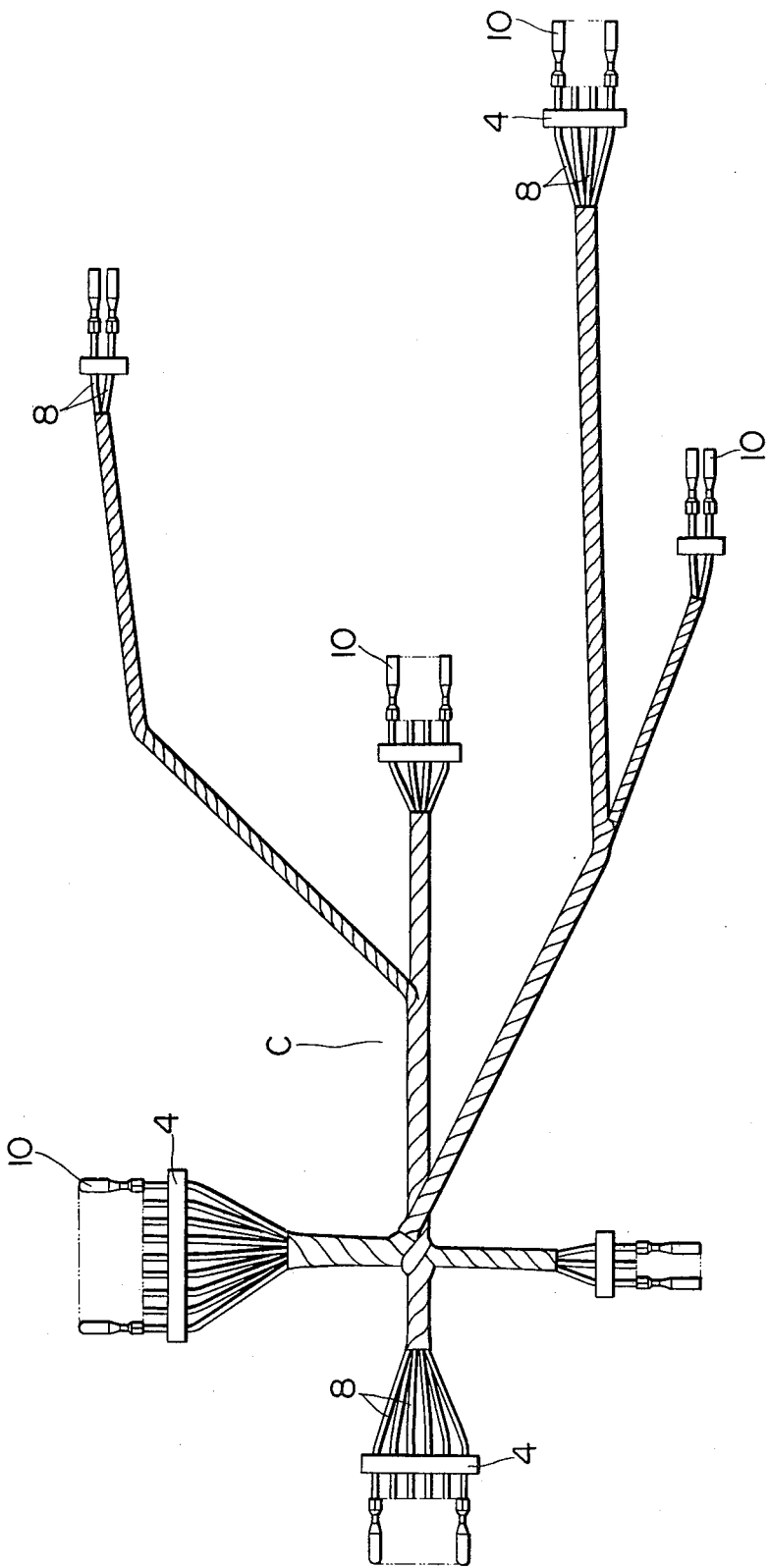
FIG. 3 shows a wire harness prepared at a stage subsequent to that shown in FIG. 2.

In a wire harness C illustrated in FIG. 3, each of the wires 8 rigid on the bridge 4 has its insulative covering removed at the end portion by an insulative covering removing unit, and a, terminal member 10 is affixed to the bare wire end by a terminal fixing unit.

Each bridge 4 in wire harness C retains the end portions of each set of wires 8 permitting a plurality of terminal members 10 to be attached simultaneously to the individual wires. Furthermore, as seen in FIG. 4, all the terminal members can be connected to a connector housing 11 simultaneously and easily.

Figure 4:
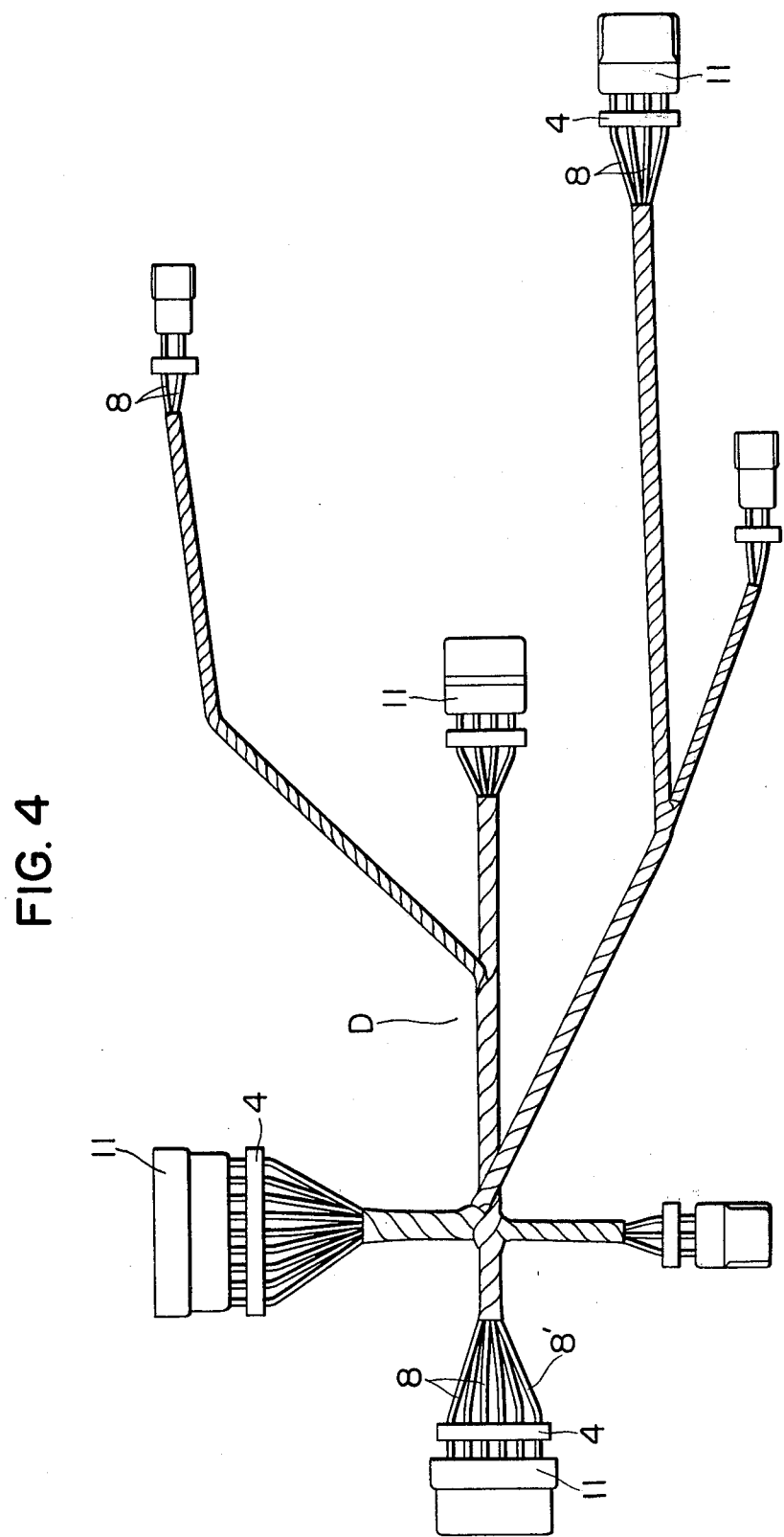
FIG. 4 shows a wire harness prepared at a final stage subsequent to that in FIG. 3.

A wire harness D in its fully processed state shown in FIG. 4 has wires 8 whose aligned end portions are securely held in the bridge 4 by fusion. Thus, when a tensile force is applied locally to a specific one of the wires, such as wire 8' as during transportation, storage or actual installation in an automobile, the bridge 4 disperses the tension to prevent the associated terminal member 10 from disengaging with the connector 11. However, if no tensile force is expected to be applied to a wire of the wire harness D in any subsequent step then the, bridge 4 may be detachably provided on the wire harness.

Referring to FIGS. 5 to 19-B, a process according to the invention will be described.

Figure 5:
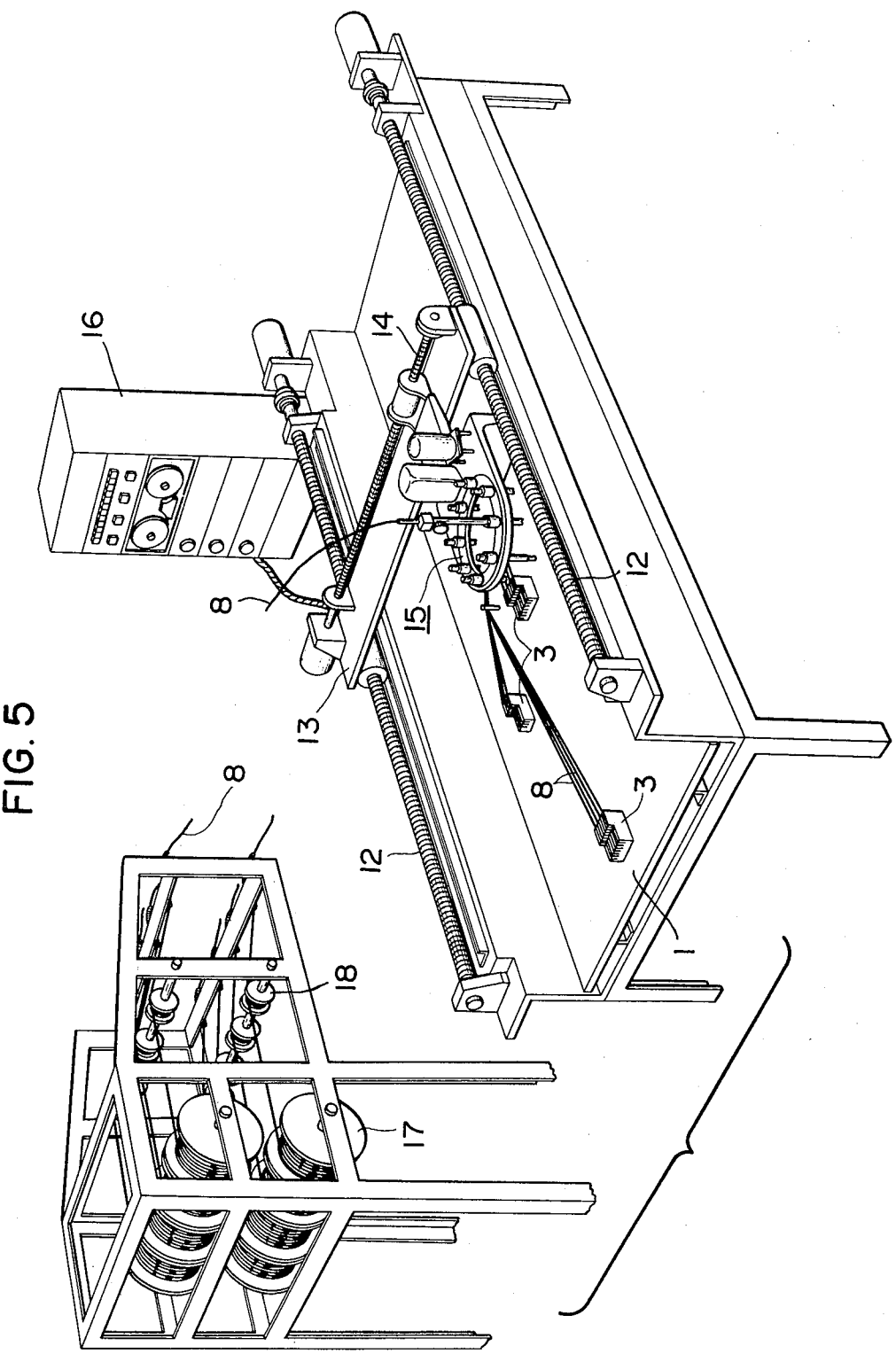
FIG. 5 is a perspective view of a device for preparing a wire harness according to the present invention.

In FIG. 5, a wiring apparatus is shown in a general perspective view. The apparatus includes a pair of threaded X shafts 12 extending along opposite longitudinal edges of the work table 1. Cross-beam 13 is movable on and along X shafts 12 and carries thereon threaded Y shaft 14 on which a wiring head 15 is movably supported. X shafts 12 are driven for rotation by a first motor (not shown) whereas Y shaft 14 is driven by a second motor (not shown). By suitably setting the amounts of rotation of shafts 12 and 14, the wiring head 15 and the wires 8 held by the head 15 can be brought to any desired position among the respective blocks 3 arranged on the work table 1. A control unit 16 is adapted to store an entire process for wiring programmed on a magnetic tape (NC control). Reference numeral 17 is a reel station where wires 8 whose insulative coverings have different colors are stored on a plurality of independent reels. Wires 8 are payed out the wiring head 15 through corresponding capstans 18 which serve to reduce the magnitude of tension imparted to the wires being driven by a motor (not shown) in the intended direction of wire feed.

Figure 6:
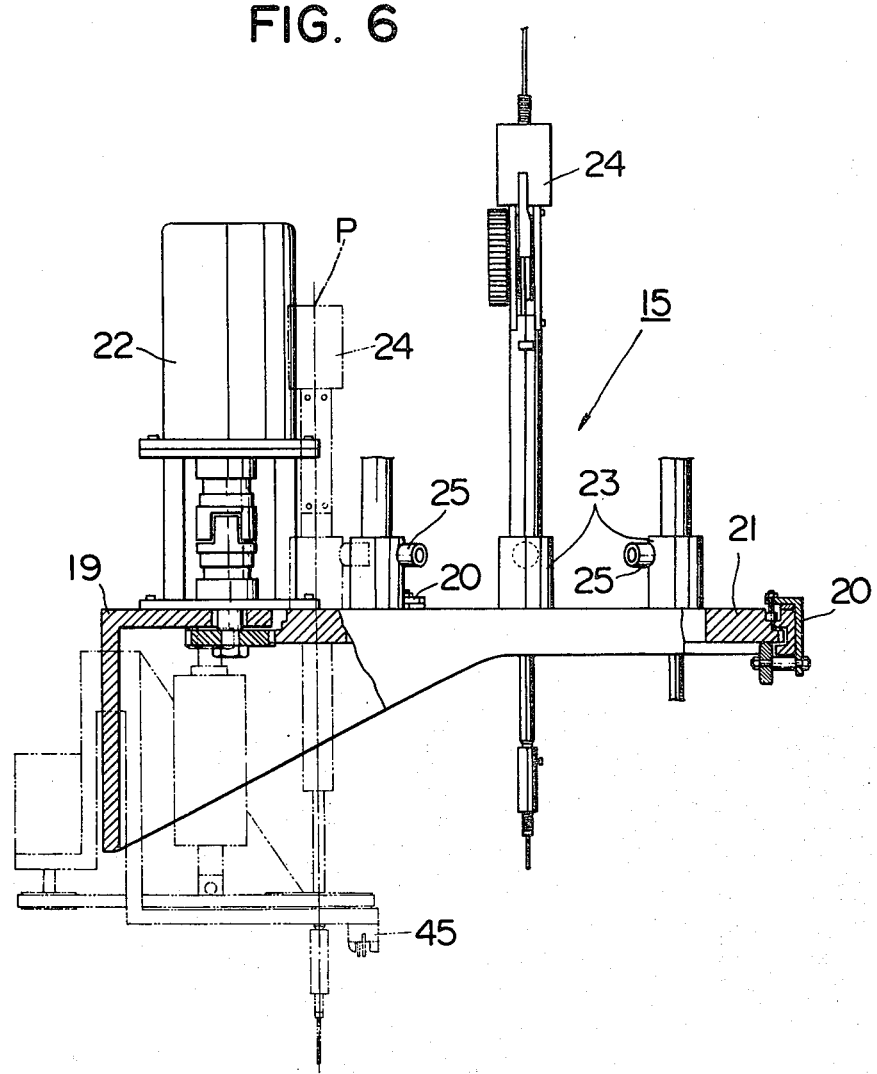
FIG. 6 is an enlarged side elevational view, cross-sectioned in part, of a wiring head used in the device of FIG. 5.

As depicted in side elevation in FIG. 6, the wiring head 15 includes frame 19, a plurality of wiring jigs 24 located on top of frame 19 and a clamping jig 45 positioned below the frame 19. The jigs 24 and 45 are commonly reciprocated and rotate relative to a predetermined position.

An annular member in the form of a jig mount 21 for mounting the wiring jigs 24 is mounted to frame 19 rotatably through a plurality of guide rollers 20. The jig mount 21 is operatively connected to a limited speed motor 22 to rotate in a horizontal plane.

Wiring jigs 24 are passed through respective tubular guides 23 which are spaced equidistant along the circumference of jig mount 21. Each of the wiring jigs 24 is locked at a preselected level by a knock pin 25.

Differently colored wires 8 are payed out from the reel station 17 to individual wiring jigs 24. Jig mount 21 when driven by motor 22 will bring a selected wiring jig 24 to a predetermined position P in FIG. 7.

Each jig 24 reaching the position P is reciprocated vertically in accordance with the action of a raising and lowering unit 26. Denoted by the reference numeral 27 is a motor adapted to drive capstan 33 provided to the jig 24.

Figure 7:
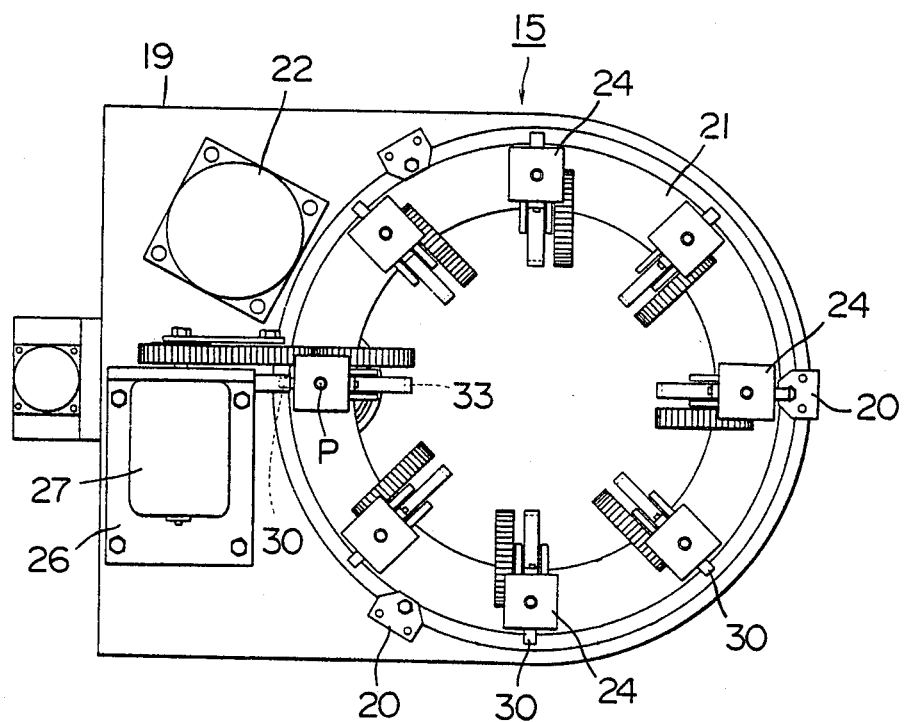
FIG. 7 is a plan view of the wiring head of FIG. 6.
Figure 8:
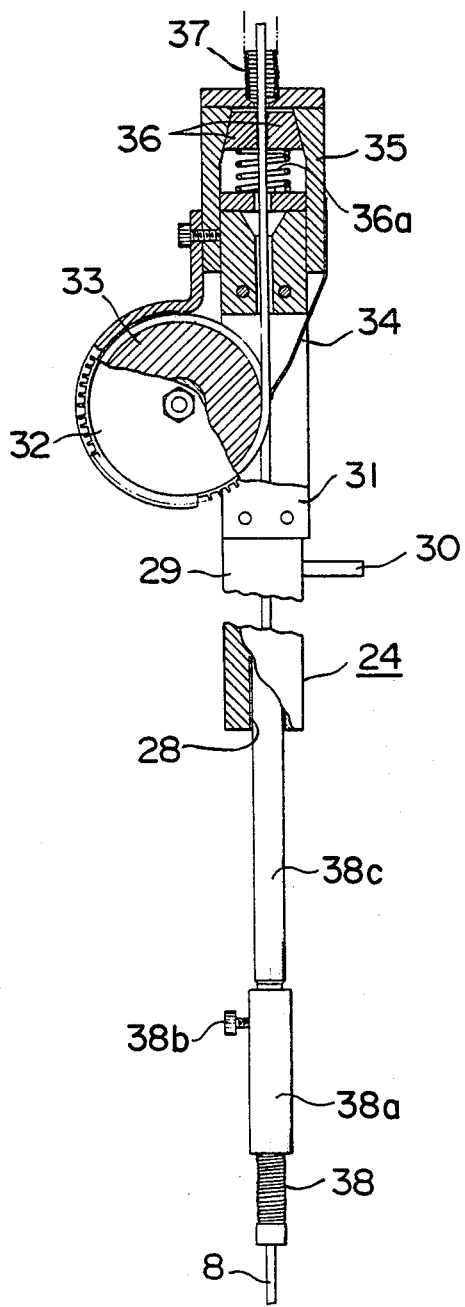
FIG. 8 is an enlarged side elevational view partly in section of a wiring jig provided in the wiring head of FIGS. 6 and 7.

FIG. 8 illustrates a detailed construction of each wiring jig 24. As shown, wiring jig 24 comprises tubular member 29 having through bore 28 extending axially therethrough to accommodate a wire. Tube 29 carries on its outer periphery a bar 30 which is engagable with the raising and lowering unit 26 (FIG. 7). Capstan head 31 and recoil prevention assembly 35 are mounted above the tube 29. Mounted below the tube 29 is a nozzle or nosepiece 38.

Capstan head 31 has a gear wheel 32 which is driven by motor 27 shown in FIG. 7 and capstan 33 is faced by a slack preventing piece 34. The recoil preventing assembly 35 has a pair of pawls 36 constantly biased by spring 36a. Flexible wire guide 37 is provided at the top of the recoil preventinng assembly 35. The nose-piece 38 is in the form of a coil spring with resiliency such that a given intensity of tension resulting from a travel of the jig 24 causes a flexure of the nosepiece in a direction opposite to the direction of travel and, upon the release of the tension, the nosepiece recovers its position. Preferably, the nosepiece 38 is additionally capable of straightening the wire 8 if it is bent.

Wire support 38c is nested in the tube 29 and carries a nosepiece support tube 38a fastened to its lower end by means of a screw 38b.

With this arrangement of the wiring jig 24, wire 8 enters jig 24 through top wire guide 37 passes between pawls 36, and is passed one turn round capstan 33. From capstan 33, the wire extends downwardly through tubes 38c and 38a and extends from lower end of nosepiece 38.

An end portion of wire 8 protruding from the nosepiece 38 is retained by clamping pawls 52 (see FIG. 11) mounted on block 3 in a manner described hereinafter. In this situation when motor 27 is energized so as to drive the wiring jig 24 causing it to run and impart a tension to wire 8, the tension is controlled by the rotating capstan 33 promoting smooth feed of the wire.

In the event wire 8 is cut by cutting edge 48 of clamping jig 45 (see FIGS. 9 and 10) which will be discussed later, the tension in wire 8 is released abruptly. In this instance, a slack preventing piece 34 facing capstan 33 exerts a resilient pressure force to prevent the recoil of the wire. Consequently, a constant measure of wire 8 extends from the outlet of the nosepiece.

Additionally, wiring jig 24 has in its upper portion the pair of pawl's 36 which are constantly biased by the spring 36a. Pawls 36 prevent wire 8 from falling out of the jig 24 even when the jig is stationary. Thus, jig 24 positively holds the wire irrespective of the operating condition.

Figure 9:
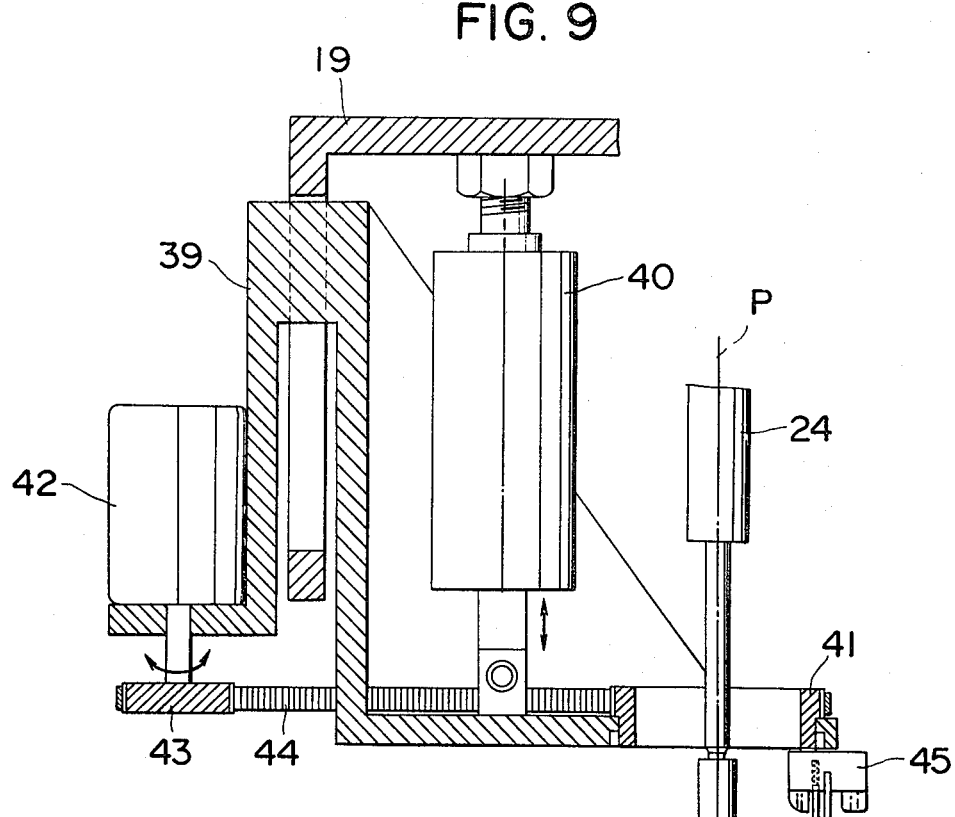
FIG. 9 is an enlarged side elevational view partly in section of a mechanism for the vertical reciprocation and rotation of a clamping jig attached to the wiring head of FIG. 6.

A mechanism for two different kinds of the movements of clamping jig 45 is indicated in side elevation in FIG. 9. Body 39 of the clamping jig is mounted to frame 19 of the wiring head so as to reciprocate vertically relative to the frame by the action of actuator 40 associated therewith. Annular jig mount 41 functions as a pulley and is rotatably mounted to the jig body 39 and is in a position where its center coincides with the axis of the wiring jig 24 at the position P. The angular orientation of jig 45 is controlled by a limited speed motor 42 which is provided with a timing pulley 43. Passed over this timing pulley 43 and the pulley 41 is an endless belt 44. With this construction, motor 42 drives the clamping jig 45 to a desired position about the wiring jig 24 while the actuator moves the clamping jig up or down as desired.

Figure 10:
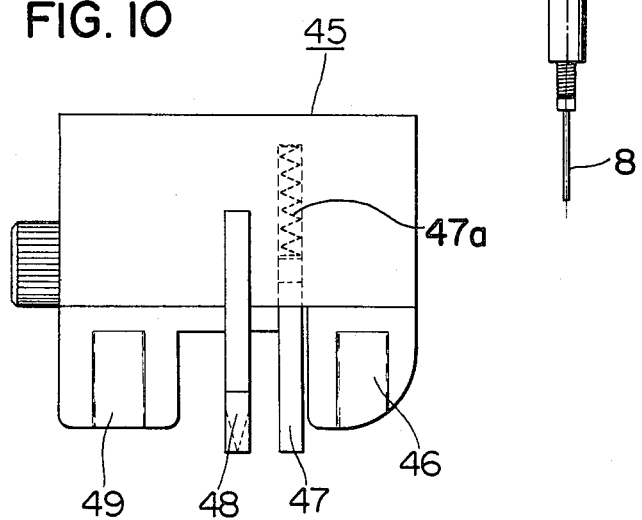
FIG. 10 is an enlarged side elevational view of the clamping jig of FIG. 9.

As shown in FIG. 10, clamping jig 45 has a front end clamping plate 46, guide plate 47 with coil spring 47a, cutting edge 48 and a rear end clamping plate 49 arranged in succession radially from the inner end to the outer end. Guide plate 47 and the cutting edge 48 protrude slightly beyond the lower ends of clamping plates 46 and 49 and are positioned in perpendicular relation to the clamping plates. Clamping plates 46 and 49 are located symmetrically to each other with respect to the cutting edge 48.

Referring to FIG. 11, wiring block 3 has a plurality of guide pins 50 at its front upper end and guide slots 54 at the rear end. Interposed between the guide pins 50 and guide slots 54 are recesses 51 for receiving a bridge 4, a series of clamping pawls 52 and a block 53 against the top surface of which cutting edge 48 will abut. Said block 53 is rigidly mounted on block 3 and functions as an edge shearer. Block 3 is also provided with a bore 55 in the vicinity of one lateral end of recess 51; bore 55 is adapted to receive a fusing jig 60 which will be referred to hereinafter. Reference numeral 56 designates a screw for releasing the clamping pawls 52.

Guide pins 50 and, guide slots 54 serve to guide the nosepieces 38 of respective wiring jigs 24 and are provided in accordance with the intended number of wires. Clamping pawls 52 retain wires during the wiring operation and until a subsequent fusing step is over.

Positional relationships of blocks 3-1 and 3-2, wiring jig 24 and clamping jig 45 are indicated in FIGS. 12A–12C. A bridge 4 is nested in the recess 51 of block 3 prior to a start of wiring operation. At a starting point of the wiring (FIG. 12-A), nosepiece 38 of wiring jig 24 is resiliently deformed into engagement with the bridge 4 and in between guide pins 50. A predetermined length of the end portion of wire 8 extends beyond the bridge 4 and is positioned between neighboring clamping pawls 52.

As clamping jig 45 is then moved downwards as viewed in FIG. 12-B, the free end of wire 8 is engaged by the guide plate 47 which is projected beyond the bottom of the clamping plate 46. The guide plate therefore centers the wire 8 between the clamping pawls 52 and then the front end clamping plate 46 positively presses the wire 8 until pawls 52 nip the wire therebetween. The wire at this instant is also retained between the corresponding pair of confronting pieces 6 on the bridge 4.

In this way, guide plate 47 and clamping plate 46 in cooperation allow the part of the wire projecting from nosepiece 38 to be retained positively on the block 3 despite the slight wire flexure which has occurred in the initial stage of wiring.

FIG. 12-C shows wiring block 3-2 which is located in opposing relation to first-mentioned block 3-1 to define a terminal point of the wiring path. At this point of the wiring process, wire 8 payed out of nosepiece 38 has been layed under tension from the block 3-1 to the block 3-2 through pins 2 on the table 1 and guide pins 50 on the blocks) (FIG. 13-A to FIG. 13-E). The nosepiece is flexed into engagement with a guide slot 54 of the block 3-2 as illustrated. Under this condition, the wire 8 is aligned with a central region between neighboring clamping pawls 52 and that between pieces 6 on the bridge 4.

When clamping jig 45 is lowered in the above situation, its rear end clamping plate 49 urges the wire 8 into the gap between clamping pawls 52 while at the same time associated cutting edge 48 in cooperation with the surface of the block 53 cuts the wire to a predetermined length.

Thereupon, motor 42 (see FIG. 9) is energized to turn the clamping jig 45 to a position immediately to the rear of wiring jig 24. This restores conditions to an initial stage of the wiring process.

Wiring procedures using wiring jig 24, clamping jig 45 and block 3 will now be described with reference to the FIGS. 13A–13E.

(1) A selected wiring jig 24 is brought to the predetermined position P whereupon the unit 26 is driven to lower jig 24 to a position rearwardly of block 3-1. (FIG. 13-A)

(2) Wiring jig 24 is moved along X shafts 12 and Y shaft 14 until it reaches the condition for starting a wiring operation (see FIG. 12-A). Then the clamping jig 45 is lowered by the actions of actuator 40, thereby fixing a predetermined length of wire 8 on the block 3-1 (see FIGS. 12-A and 12-B) and then jig 45 is raised and capstans 18 and 33 are driven. (FIG. 13-C)

(3) Wiring jig 24 is caused to travel toward wiring block 3-2 while laying out wire 8. (FIG. 13-C)

(4) Wiring jig 24 is positioned at the terminal point of wiring (see FIG. 12-C) relative to block 3-2 whereupon the clamping jig 45 is again lowered to lock and cut the wire 8 and is then raised. Subsequently, the drive of capstans 18 and 33 is interrupted. (FIG. 13-D)

(5) The orientation of the clamping jig is as follows. Wiring jig 24 moving along the X and Y shafts is shifted to a position behind block 3-2 while the clamping jig 45 is brought to a position immediately to the rear of the wiring jig 24. (FIG. 13-E)

(6) Moving along shafts X and Y toward another preselected wiring block, wiring jig 24 is elevated by the action of unit 26 and is returned to the start position.

(7) By repeating steps (1) to (6) with one or more of jigs 24 a desired wire harness A as presented in FIG. 1-A is now obtained.

Referring to FIG. 14-A and (FIGS. 15C and 15D), wire 8 held between clamping pawls 52 is supported by block 53 for the cutting operation. If end portions of wires are required to be held in the bundle, another wire is laid upon the already cut wire as shown in FIG. 14-B, preventing proper cutting of wire 8. FIGS. 15-A to 16-E show a modification of wiring block 3 in which the above situation is avoided.

Wire retaining groove 57 (FIGS. 15C and 15D) is defined between lower portions of neighboring clamping pawls 52 while edge bearing member 59 faces recess 58 lying between the pawls 52 and guide groove 54' and is capable of elevating and tilting movements.

Edge bearer member 59 includes a pair of arms 60 each of which has a lower portion journalled to the body 3 by cam shaft 62 received in a vertically elongate slot 61 of the arm; slot 61 has its upper end enlarged. Spring 63 is anchored at one end to an intermediate portion of each arm 60 and at the other end to the upper part of body 3. Arms 60 are usually biased by springs 63 to hold a position inclined toward guide groove 54' on top of body 3.

Wire guide groove 64 extends on that surface of the edge bearer member 59 which faces the clamping pawls 52. Lugs or cams 65 project upwardly from the edge bearer on opposite sides of groove 64. These lugs 65 are adapted to pull arms 60 up from the inclined position when engaged by the cutting edge 48. The wiring block further includes pins 66 and 67 for retaining spring 63 and stop pins 68 adapted to limit the tilting movement of the arms 60.

Operation of the wiring block 3 having the above construction will be described hereinafter.

(1) As shown in FIG. 16-A, wire 8 is layed on the clamping pawls 52 on wiring block 3 and edge bearer 59. In this situation, each arm 60 is kept by the tension of the spring 63 in a position raised obliquely upwardly about the lower end $0_1$ of its elongate slot 61.

Laying of the wire is performed by wiring jig 24 as already discussed in conjunction with FIGS. 12A–12C.

(2) Under the above-mentioned condition, the cutting edge 48 of clamping jig 45 is lowered into engagement with slants 65$a$ of lugs 65. The resultant horizontal component of a force action on slants 65$a$ causes arms 60 to pivot to a raised position about point $0_1$ of the corresponding slots 61.

Thus, the tension and angular position of each spring 63 is preselected such that the following relations are satisfied:

$$F_h > T_h, \; F_v < T_v$$

Where $F_h$ and $F_v$ denote horizontal and vertical components of a force action on the slant 65$a$, respectively, and $T_h$ and $T_v$ horizontal and vertical components attributable to the resiliency of the spring 63. This permits arms 60 to be raised about point $0_1$ of the slots 61. (FIG. 16-B)

(3) Another lowering of cutting edge 48 moves arms 60 downwardly along slots 61 until wire 8 is cut off. The center of pivotal movement of arm 60 is shifted by spring 63 from $0_1$ to point $0_2$ contained in an upper portion of slot 61. (FIG. 16-C)

(4) When cutting edge 48 starts its upward or return stroke, arm 60 is retained in the upright lowered position through the upper enlarged portion of slot 61. Upon the disengagement of cutting edge 48 from slant 65$a$, the arm tilts backwardly about point $0_2$ under the action of the spring 63. At this instant, cam shaft 62 leaves enlarged portion $0_2$ so that arm 60 is elevated obliquely along slot 61. (FIG. 16-D)

(5) Raised by spring 63 while inclining, arm 60 returns to the initial position (FIG. 15-A) without pushing the cut wire 8 up. Moreover, cut wire 8 does not give any touch to the edge bearer 60 owing to the guide groove 64 (FIG. 15D). (FIG. 16-E) Edge bearer 60 is thus always positioned above a wire which has been cut off as shown in FIGS. 16-A and 16-B. Accordingly, when overlayed on the cut wire, the next wire will be cut off by cutting edge 48 while being pushed down (FIG. 16-B). A plurality of wires can be retained in superposed relation with the aid of the recess or wire guide grooves 64 defined between lower portions of the clamp pawls 52. The wiring block of this type is usuable in combination with ones as shown in FIG. 11 to prepare a wire harness which, as depicted in FIG. 17, has a desired configuration such as block 3a in which end portions of wires 8 are held at equal spacings on bridge 4 and block 3b in which a plurality of wires are retained in superposed relation.

A positional relationship between wiring block 3 and a fusing unit is illustrated in FIGS. 18-A and 18-B. A fusing jig 72 includes body 69 which is vertically mounted to frame 70 to reciprocate through actuator 71.

The body 69 of the fusing jig is provided therein with a slidable plate 73 having a plurality of slots 74. Accommodated in the respective slots 74 are pressing bars 75 which are arranged in a comb-like configuration and each having an arcuate recess 76 at the lower end. These pressing bars 75 are reciprocated vertically following the action of actuator 77. Device 78 for supplying hot air is tiltably supported by body 69 of the jig.

Accommodating a heater (not shown), the blasting device 78 feeds air from ducts 79 and blasts hot air onto pieces 6 on bridge 4, thus fusing the insulative coverings of wires 8 therewith. The fusing jig is also provided with pin 80 which is engagable in the previously mentioned bore 55 of block 3.

To fuse bridge 4 and the wires 8 together, the fusing jig 72 will be explained as depicted in FIG. 19-A. In FIG. 19-A, actuator 71 lowers pin 80 of jig 72 into engagement in the bore 55 of the wiring block 3 and positions the respective pressing bars 75 on bridge 4. The blasting device 78 then blow hot air toward bridge 4.

After hot air processing actuator 77 is driven to lower pressing bars 75 into recess 51 of block 3 where bridge 4 is positioned, the tops of the pieces 6 are pressed against and fused to the insulative coatings of the corresponding wires 8 by the arcuate recesses 76 of bars 75 as viewed in FIG. 19-B. It will be recalled here that the confronting pieces 6 on bridge 4 have slants 7 (FIG. 1B) along the upper edges thereof.

Pieces 6 are engaged and deformed inwardly towards each other to seal wire 8 therein by the recessed bottom of the corresponding pressure bar 75. The fusing jig 72 may be provided corresponding to each of multiple blocks 3 shown in FIG. 1-A in order to perform all at one time. Branching portions of respective wires 8 are thereafter wound with strips of tape 9, yielding a wire harness B as indicated in FIG. 2.

The thus obtained wire harness B is further subjected to a insulative covering removing step, a terminal fixing step, and a connector housing attaching step.

Referring to FIG. 20, an apparatus embodying the present invention includes outer framework supporter 81 and inner framework supporter 82. Within inner framework supporter 82, there is provided wire holder 83, uncovering and cutting unit 84 and terminal attaching unit 85. These assemblies 84 and 85 function in cooperative relation with wire holder 83. Denoted by the reference numeral 86 is an electric wiring extending from a control box (not shown) to the respective units of the apparatus.

Detailed constructions and operations of the various units will be stated in succession.

Wire holder 83 serves as a platform on which end portions of wire harness B are held. A plurality of guide pins 87 project upwardly from the rear end of the platform while an auxiliary clamp 88 is pivoted the platform in such a manner as to be movable toward and away from the series of guide pins 87. Wire holder 83 has leg 90 of a rectangular section supported through a spring and a knock pin (not shown) by frame 90 which uprises from seat 91 of inner framework supporter 82. Under usual condition, the wire holder is urged upwardly by the spring and held at a predetermined level by the knock pin. In the event of attaching terminal members to wires, the knock pin is retracted by a movement of terminal fixing unit 85 to lower the wire holder whereby terminal members are allowed to reach a station below uncovered portions of the wires Reference numeral. 88' designates a clamp adapted to press auxiliary clamp 88 from above.

Unit 84 is illustrated in partly sectioned elevation in FIG. 21. Base plate 92 is positioned at the rear of the wire holder 83.

Mounted rigidly to a rear portion of base 92 is cylinder 93 having piston 94 which is connected to lower plate 96 forming part of frame 95. Guides 99 extend along opposite sides of base 92 to guide the movement of lower plate 96 as will be described hereinafter. Base 92 has in its front portion recess 100 in which disc 101 is rotatably journalled. Cam 120 is engagable with disc 101 to limit the movement of frame 95 toward wire holder 83 caused by cylinder 93.

Front plate 98 forming another part of frame 95 is formed with elongate slot 102 extending vertically in an intermediate area of the front plate 98. Upper edge holder 103 and lower edge holder 103' are vertically slidable and guided by slot 102.

Reference numerals 104 and 104' designate upper and lower cutting edges, respectively, each having a plurality of equally spaced and V-shaped edge portions 105 (four shown in the drawing) as viewed in FIG. 22. Edge members 104 and 104' are secured to the front ends of the corresponding holders 103 and 103' such that their edge portions 105 confront each other while having their backs aligned along a common axis. Meshing of lower cutting edge 104' with upper cutting edge 104 can be finely adjusted by adjusting screw 106.

Cylindrical cam 108 is journalled to upper and lower plates 97 and 96 of frame 95 at opposite ends and is provided with cam grooves 109 and 109' on its periphery. Arms 107 and 107' extending from the rear ends of the edge holders 103 and 103' are slidably engaged in the cam grooves 109 and 109', respectively.

The cam grooves 109 and 109' extend throughout the circumference of cam 108 in vertically symmetrical relation. Each of the cam grooves has four substantially horizontal stepwise sections 109-A, 109-B, 109-C and 109-D at regular spacings of 90° along the circumference of cam 108. Accordingly, cam 108 in rotation causes the upper and lower cutting edges 104 and 104' to move toward and away from each other.

The horizontal sections 109-A to 109-D of the grooves 109 and 109' have such levels as will be discussed in conjunction with FIGS. 24-A to 24-D. When arms 107 and 107' associated with the corresponding edge holders move from the section 109-A to the sections 109-D via sections 109-B, 109-C, 109-D and back to 109-A in accordance with each counterclockwise 90° movement of cam 108, upper and lower cutting edges 104 and 104' are successively moved through:

(i) a position remotest from wires 8 (FIG. 24-A),
(ii) a position in which they touch insulative coverings 8a of the wires 8 from above and below (FIG. 4B),
(iii) a position in which they cut into the coverings 8a from above and below (FIG. 24-C),
(iv) a position in which they overlap each other to cut off conductors 8b of the wires (FIG. 24-D) and back to the position (i).

The rotation of cam 108 and corresponding movements of the cutting edges 104 and 104' are regulated by a reversible motor 110.

Capable of clockwise and counterclockwise movements of 90°, motor 110 is secured to lower plate 96 of frame 95 and has an output shaft 111 which rigidly supports and carries in its upper portion plate 112 having pawl 113. Gear 115 having ratchet teeth 114 on its underside is rotatably coupled over a cylindrical extension of the plate 112.

The gear 115 is constructed such that a clockwise movement of motor 110 causes gear 115 to turn in the same direction as ratchet 114 which is meshed with pawl 113. Upon a reverse rotation of the motor, however, pawl 113 releases ratchet 114 to permit idling of gear 115. The clockwise movement of motor 110 is transmitted to cam 108 through gear 115 and gear 116 which is rigidly mounted on a shaft of the cam 108 and is meshed with gear 115, thereby varying the position of the cutting edges 104 and 104'. A reverse rotation of the motor 110 however allows gear 115 only to idle without displacing the cutting edges.

Flat cam 120 held in sliding engagement with disc 100 functions to regulate the operating positions of the cutting edges 104 and 104'. As shown in FIG. 23, cam 120 has four curved points a, b, c and d at equal angular spacings of 90° around the circumference. The distances from the center o of the cam to the respective points a to d are selected to satisfy the following relation and equation:

$$\overline{oa} < \overline{ob} < \overline{oc} < \overline{od}$$

$$\overline{oc} - \overline{ob} = d$$

where d indicates the length of the uncovered conductor 8b of the wire 8.

In the situation depicted in FIG. 21, cam 120 is slidably engaged with disc 100 at its point a so that cutting edges 104 and 104' remain disengaged from each other at the position where they touch the wires 8. Subsequent reverse rotations of motor 110 cause cam 120 to turn reversely by 90° each whereby the cutting edges are moved from position O to position O₃ via position O₁ and position O₂ as shown in FIGS. 28-A to 28-E.

Figure 25:
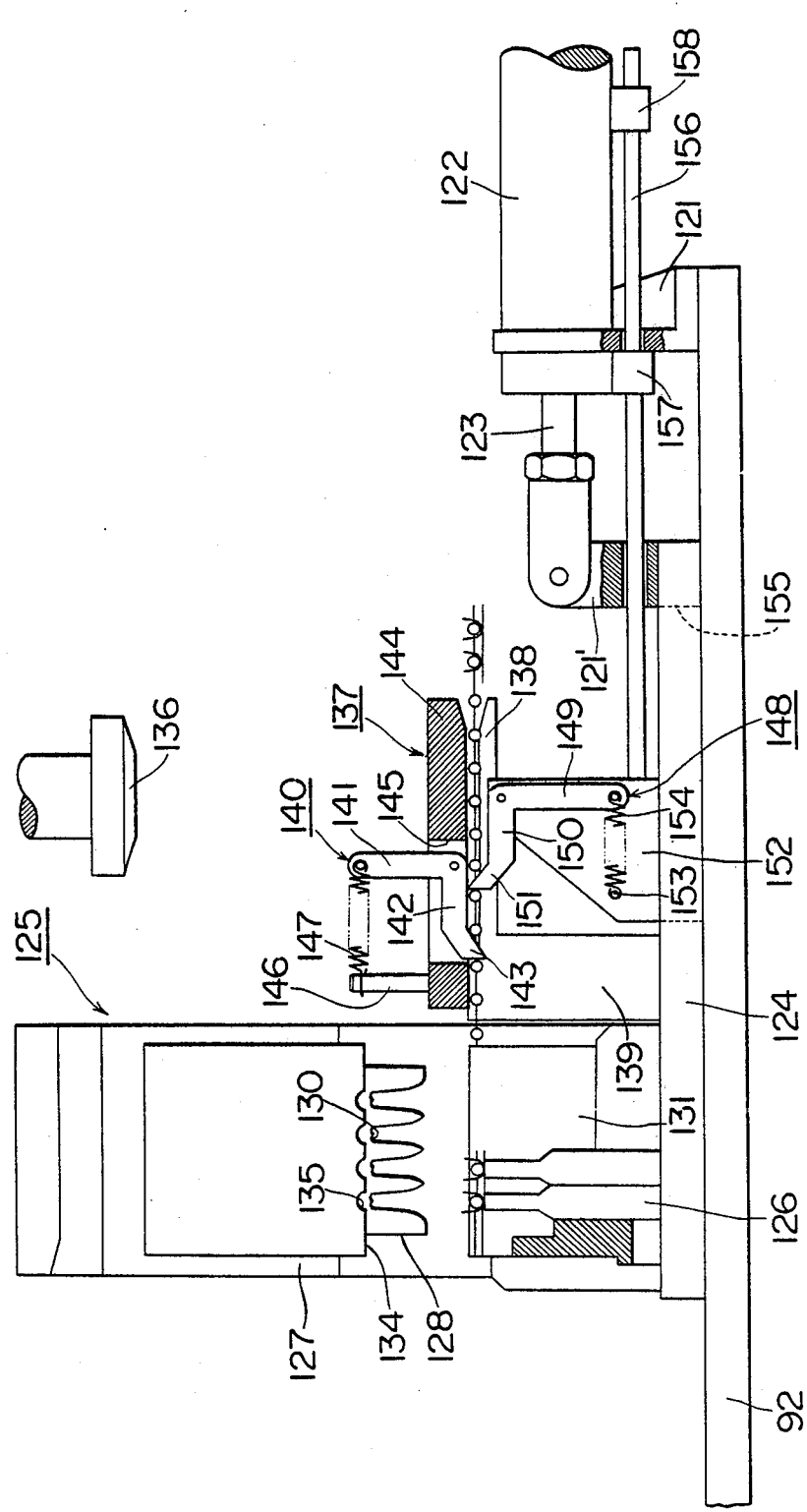
FIG. 25 is a front elevational view of a terminal fixing unit provided in the device of FIG. 20.

Terminal attaching unit 85 is illustrated in partly sectional front elevation in FIG. 25. Cylinder 122 is rigidly mounted through bracket 121 to one end (right end) of the base 92. Piston rod 123 extending from cylinder 122 is connected through bracket 121' to one end of frame 124 so that frame 124 is bodily movable laterally with respect to and behind wire holder 83.

Device 125 for pressing terminal members onto wires is mounted to frame 124 in a position opposite to the piston rod 123.

Figure 26:
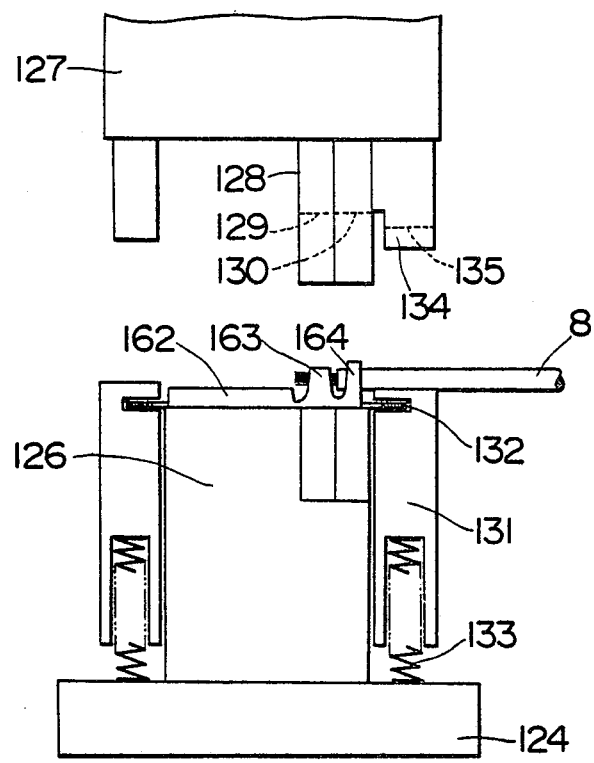
FIG. 26 is a side view of an illustration of a wire harness and a train of interconnected terminal members which are supplied into said unit.

The pressing device as shown in FIG. 26 includes lower die 126 and upper die 128 secured to holder 127. Upper die 128 has on its underside grooves 129 and 130 which correspond to individual portions 163 and 164 of terminals 162 as will be discussed hereinafter. A shear blade 131 is mounted through springs 133 to the outer periphery of lower die 126. Shear blade 131 is formed with recess 132 for supporting terminals 162 in an upper portion of its inner wall. Shear blade presser 134 projects downwardly from die holder 127 and has grooves 135 on its underside for accommodating the escape of wires. Die holder 127 is constantly urged by springs (not shown) to a position above the lower die 126 and operated by a hydraulic ram 136.

Reference numeral 137 denotes a terminal conveyor unit make up of platform 138, first pawl 140 for preventing reverse travel of terminals and a second pawl 148 for feeding terminals.

Secured to frame 124 in the vicinity of the lower die 126 is a, platform 138 which comprises two generally L-shaped parallel side plates spaced suitably from each other. Each of these side plates is formed with a terminal supporting recess (not shown) in the same way as shear blade 131.

First pawl 140 is afforded by a generally L-shaped flat member having vertical arm 141 and horizontal arm 142 which has a downwardly inclined end portion 143.

Part of the pawl 140 where arms 141 and 142 join is pivotally mounted to a wall of window 145 formed through a central area of pawl mount 144. Spring 147 is anchored at one end to vertical arm 140 and at the other end to a pin 146 studded on the pawl mount 144, whereby horizontal arm 142 is constantly biased to urge terminals 162 downwardly with its lower surface.

Likewise, the second or feed pawl 148 takes the form of a generally L-shaped flat member having vertical arm 149 and horizontal arm 150. Horizontal arm 150 has an upwardly inclined end portion 151 which is contrastive to the downwardly inclined portion 143 of the first arm 140.

An intermediate bent portion of the pawl 148 is pivotally mounted to the upper part of a second pawl mount 152. This pawl 148 is biased by spring 154 retained by vertical arm 149 and pin 153 such that the upper surface of horizontal arm 159 constantly urges the terminals 162 upwardly.

The second pawl mount 152 has a base portion nested in a groove 155 extending along the center of frame 124 and is thus slidable along the groove while facing inner walls of the confronting side plates 139 of the terminal support 138. Feed rod 156 extends from the rear end of pawl mount 152 through the brackets 121' and 121. A pair of cooperating adjuster pieces 157 and 158 are held in threaded engagement on rod 156 on opposite sides of bracket 121 for the adjustment of the amount of terminal feed.

Figure 27:
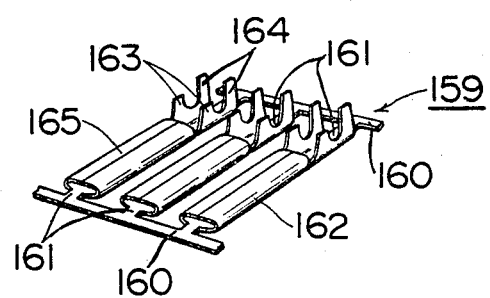
FIG. 27 is a perspective view of the train of terminal members supplied as shown in FIG. 26.

Turning to FIG. 27 and as, generally designated by reference numeral 159, is a train of interconnected terminal members 162. The terminals 162 are united together in parallel relation at predetermined spacings by two parallel support pieces 160 and cross-pieces 161. The assembly 159 also includes raised portions 163 and 164 for retaining conductors and insulative coverings of wires when processed, respectively, and electric contact portions 165.

Reference will now be made to FIGS. 28-A to 29-B for the description of a method of uncovering and cutting end portions of wires and fixing terminal members to the same.

(1) Securely retained by bridge 4 except an end portion, each wire 8 is loaded on the wire holder 83 and nipped by guide pins 87 and auxiliary clamp 88. The cutting edges 104 and 104' remain in a position spaced backwardly from wire holder 83. (FIG. 28-A)

(2) The cutting edges 104 and 104' in their open position are moved toward wire holder 83 until the movement is interrupted at position O. (FIG. 28-B)

To effect this movement of the cutting edges, frame 95 is advanced by the action of cylinder 93 with arms 107 and 107' held in the sections 108-A of the grooves 109 and 109' as viewed in FIG. 24-A, causing the curved point a of flat cam 120 to abut against disc 101 and thus become halted.

(3) The cutting edges 104 and 104' are brought closer to each other to lightly nip wire 8 from above and below (position O) and then moved back to position $O_1$. (FIG. 28-C)

More specifically, motor 110 is first turned 90° clockwise so that cutting edges 104 and 104' nip the wire therebetween (FIG. 24-B) in accordance with the rotation (reverse) of cylindrical cam 108. Motor 110 is thereafter turned 90° reversely whereby the flat cam 120 is rotated (reverse) to move the cutting edges backwardly to position $O_2$. The drive pressure in this instance is preselected to be of such a magnitude as to permit a retreat of piston rod 123 of cylinder 122 during the rotation of flat cam 120.

In the above procedures (2) and (3), cutting edges 104 and 104' hold wire 8 which has been neatly nested in between neighboring guide pins 87. Hence, the end portion of the wire is nipped positively even if bent in any direction and, moreover, the bent is corrected to straighten the wire.

In the position $O_1$ the cutting edges are respectively driven into the insulative covering 8a alone of the wire 8 and then moved back to position $O_2$. Consequently, wire 8 has its conductor 8b exposed over the length $O_1$-$O_2$ (FIG. 28-D).

More specifically, motor 110 is driven forwardly and reversely in sequence to cause reverse rotations of cylindrical cam 108 and flat cam 120. Frame 95 (FIG. 21) thus recedes while the cutting edges uncover wire 8 (FIG. 24-C).

At position $O_2$, the cutting edges cut the conductor 8b of the wire off and thereafter return to the initial position remote from the wire holder. As a result, the respective wires 8 are cut off at positions commonly distant from the bridge 4 to have their ends all aligned. Also, the exposed lengths d of the conductors 8b are the same as one another. (FIG. 28-E)

For the above procedure, motor 110 is again driven for successive forward and reverse rotations to turn cylindrical cam 108 and flat cam 120 reversely causing the cutting edges to obtain the cutting state (FIG. 24-D) and then position $O_3$. Subsequently, cylinder 93 is actuated to move frame 95 rearwardly whereupon motor 110 is again turned forwardly and reversely to thereby allow cams 108 and 120 and other members to restore the positions indicated in (1).

The peeling and cutting of wires are completed in the above-described manner. In short, motor 110 is driven for successive forward and reverse motions repeatedly four times to cause one full rotation of each of cams 108 and 120; the cooperative mechanism of the cams 108 and 120 actuate the cutting edges for nipping, peeling and cutting of wires in preselected positions.

(6) Terminal attaching unit 85 is located to the right of wire holder 83. (FIG. 20)

(7) Frame 124 is moved by the action of the cylinder 122 until fixing unit 125 reaches a position at the rear of wire holder 83.

Train 159 of terminals advance in correspondence with the number of wires 8 under the actions of L-shaped pawls 140 and 148. (FIG. 29-A)

(8) Individual terminals 162 in the train 159 are fixed onto the end portions of respective wires 8 while, at the same time, the connecting pieces 161 at opposite ends of terminal 162 are cut off and separated from the terminals.

More specifically, in FIGS. 29-A to 29-B, ram 106 is actuated to lower upper die 128 onto lower die 126 so as to press raised pieces 163 and 164 of terminals 162 firmly onto wires 8. Simultaneously, shear blade presser 134 is lowered to push shear blade 131 downwardly against the action of springs 133 thereby cutting the connecting pieces 161 off from terminals 162. Meanwhile, wires 8 are received in and protected by grooves 135 of shear blade presser 134.

(9) Thereafter, ram 106 is elevated and shear blade 131 restores the ordinary raised level with the aid of the springs 133. By the cylinder 122, unit 85 is bodily moved away from wire holder 83 back to the position shown in FIG. 29-A.

While the distance travelled by terminal attaching unit 85 is $\overline{QQ_1}$, the amount of movement of the feed pawl 148 of conveyor device 137 is limited to $\overline{Q_2Q_3}$ by the adjuster pieces 157 and 158. Hence a number of terminals 162 corresponding to the difference in distance $\overline{QQ_1} - \overline{Q_2Q_3}$ (four in the illustrated case) will be supplied in the next pressing step. In other words, a desired number of terminals can be fed to lower die 126 merely by adjusting the spacing between pieces 157 and 158.

The steps (1–9) discussed hereinabove will be repeated in sequence. Thus, a plurality of wire end portions can be subjected simultaneously to each step of removing the insulative covering, cutting the conductive portion and fixing terminals onto the exposed end portions. It will readily occur to those who are skilled in the art that such procedures can take place automatically under known sequence control or can be controlled manually for each step. Terminal housing 11 can be attached to the thus obtained wire harness C to accommodate the terminal members and form completed wire harness D.

It will therefore be appreciated that a wire harness obtainable by the present invention promotes easy connection of terminal members and attachment of connectors and the like. Thus, as a whole, productivity is improved.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

What is claimed is:

1. A method of manufacturing a wire harness comprising the steps of:
   (a) arranging a plurality of wiring blocks at predetermined spacing therebetween, each wiring block carrying a bridge adapted to hold a plurality of covered wires thereon at their end portions extending from the bridge by equal amounts;

(b) engaging one free end portion of a covered wire on one wiring block of said plurality of wiring blocks;

(c) extending said covered wire above a second wiring block of said plurality of wiring blocks;

(d) engaging the covered wire on said second wiring block to cut said wire at a predetermined position beyond the engaged portion thereof, said engaging and extending steps (b), (c), (d) including a feeding of said wire in a direction perpendicular to a plane of the harness and, step (d) further including a cutting of said wire at the site of said second wiring block independently of the presence of a second wire contiguous to said covered wire;

(e) repeating the steps of (a) to (d) whereby a plurality of covered wires is laid out between intended wiring blocks; and (f) fastening each covered wire to the related bridge wherein said bridge has a nipping meands disposed nearby and each step of (b) and (d) includes a step of nipping said wire by said nipping means.

2. A method of manufacturing a wire harness comprising the steps of:

(a) arranging a plurality of wiring blocks at predetermined spacing therebetween, each wiring block carrying a bridge adapted to hold a plurality of covered wires thereon at their end portions with suitable spacings therebetween and with said end portions extending from the bridge by equal amounts;

(b) engaging one free end portion of a covered wire on one wiring block of said plurality of wiring blocks;

(c) extending said covered wire above a second wiring block of said plurality of wiring blocks;

(d) engaging the covered wire on said second wiring block to cut said wire at a predetermined position beyond the engaged portion thereof, said engaging and said extending steps (b), (c), (d) including a feeding of said wire in a direction perpendicular to a plane of the harness and, step (d) further including a cutting of said wire at the site of said second wiring block independently of the presence of a second wire contiguous to said covered wire; and (e) repeating the steps of (a) to (d), whereby a plurality of covered wires is laid out between intended wiring blocks; and (f) fastening each covered wire to the related bridge, said fastening including a bending of partitions of respective ones of said wiring blocks about a covered wire to form an arch thereabout.

3. A method of manufacturing a wire harness, according to claim 2, wherein said covered wire is payed out from a selected one of at least one reel.

4. A method of manufacturing a wire harness according to claim 2, wherein said bridges are of a thermoplastic resin and each step of (b) and (d) includes the steps of (f) depositing the covered wire on a bridge, (g) heat fusing the bridge, and (h) pressing the bridge and the covered wire together.

5. A method of manufacturing a wire harness according to claim 2, wherein each step of (b) and (d) includes a step of securing the covered wire onto the bridge with an adhesive.

6. A method according to claim 2, wherein said plurality of wiring blocks are arranged on a work table stationed at a first work zone, and said method further including the step of (j) shifting the work table to a second work zone, and, said step of (f) being performed in the second work zone.

7. A method of manufacturing a wire harness comprising the steps of:

(a) arranging a plurality of wiring blocks at predetermined spacings therebetween on a work table, each wiring block detachably carrying a bridge thereon adapted to hold a plurality of covered wires thereon at their end portions with suitable spacings therebetween;

(b) paying out a covered wire substantially vertically from above to direct a free end thereof toward the work table;

(c) translating said covered wire toward a first wiring block selected from said plurality of wiring blocks to bring said wire into contact therewith sideways, said translating step being continued to lay the wire on the first block;

(d) stopping said translating step to clamp the wire on the first wiring block;

(e) resuming the translating step to impart the clamped wire with tension while further paying out the same from above;

(f) engaging the clamped wire in a stretched condition with the bridge on said first wiring block at a first point spaced apart from the free end by a predetermined distance;

(g) continuing said resumed translating and paying-out step to extend, in a stretched condition, the covered wire above a second wiring block selected from said plurality of wiring blocks;

(h) engaging the said covered wire with the bridge on said second wiring block;

(i) maintaining said stretched condition to clamp the wire on the second wiring block at a predetermined position;

(j) cutting the wire at a second point beyond said predetermined position and spaced apart from the bridge by a predetermined distance;

(k) repeating the steps (a) to (j) whereby a plurality of covered wires are laid out between intended wiring blocks; and (l) fastening each covered wire to the related bridge.

8. A method of manufacturing a wire harness according to claim 7, wherein said covered wire is payed out from at least one reel.

9. A method of manufacturing a wire harness according claim 8, wherein said bridges are of a thermoplastic resin and each step of (f) and (h) includes the steps of (m) depositing the covered wire on each related bridge, (n) heat fusing the bridge, and (o) pressing the bridge and the covered wire together.

10. A method of manufacturing a wire harness according to claim 7, wherein each step of (f) and (h) includes a step of securing the covered wire onto the bridge with an adhesive.

11. A method of manufacturing a wire harness according to claim 7, wherein said plurality of wiring blocks are arranged on the work table stationed at a first work zone, and said method further including the step of (p) shifting the work table to a second work zone, said step of (a) to (k) being performed in the first work zone, and said step of (l) being performed in the second work zone.

* * * * *